United States Patent
Ohno et al.

(10) Patent No.: US 12,188,876 B2
(45) Date of Patent: Jan. 7, 2025

(54) OPTICAL INSPECTION METHOD, NON-TRANSITORY STORAGE MEDIUM STORING OPTICAL INSPECTION PROGRAM, PROCESSING DEVICE, AND OPTICAL INSPECTION APPARATUS

(71) Applicants: KABUSHIKI KAISHA TOSHIBA, Tokyo (JP); Toshiba Digital Solutions Corporation, Kawasaki-shi Kanagawa (JP)

(72) Inventors: Hiroshi Ohno, Tokyo (JP); Hiroya Kano, Kawasaki Kanagawa (JP); Takahiro Kamikawa, Tokyo (JP); Hideaki Okano, Yokohama Kanagawa (JP); Akifumi Ohno, Tokyo (JP); Akio Kawasaki, Kawasaki Kanagawa (JP); Toshihiro Kikkawa, Yokohama Kanagawa (JP)

(73) Assignees: Kabushiki Kaisha Toshiba, Tokyo (JP); Toshiba Digital Solutions Corporation, Kawasaki (JP)

( * ) Notice: Subject to any disclaimer, the term of this patent is extended or adjusted under 35 U.S.C. 154(b) by 113 days.

(21) Appl. No.: 17/652,493

(22) Filed: Feb. 25, 2022

(65) Prior Publication Data
US 2023/0077793 A1    Mar. 16, 2023

(30) Foreign Application Priority Data
Sep. 14, 2021    (JP) ................... 2021-149457

(51) Int. Cl.
*G01N 21/88*    (2006.01)
*G01N 21/94*    (2006.01)

(52) U.S. Cl.
CPC ......... *G01N 21/8806* (2013.01); *G01N 21/94* (2013.01); *G01N 2021/8845* (2013.01)

(58) Field of Classification Search
CPC . G01N 21/8806; G01N 21/94; G01N 21/8845
See application file for complete search history.

(56) References Cited

U.S. PATENT DOCUMENTS 6,384,917 B1 * 5/2002 Fradkin .................... G01J 3/51
                                                             356/402
10,180,529 B2   1/2019 Ohno et al.
(Continued)

FOREIGN PATENT DOCUMENTS

JP    H11-118604 A    4/1999
JP    2000-9655 A    1/2000
(Continued)

OTHER PUBLICATIONS

W.L. Howes, "Rainbow schlieren and its applications," Applied Optics, vol. 23, No. 14, pp. 2449-2460 (1984).
(Continued)

*Primary Examiner* — Uzma Alam
*Assistant Examiner* — Mohamed Doumbia
(74) *Attorney, Agent, or Firm* — Finnegan, Henderson, Farabow, Garrett & Dunner, LLP

(57) ABSTRACT

According to the embodiment, an optical inspection method for a surface state of a subject includes acquiring and discriminating. The acquiring includes acquiring a color vector of a color corresponding to a wavelength spectrum in a color coordinate system of n dimensions (n is a natural number equal to or larger than 1), which is equal to or smaller than a number of a plurality of color channels of pixels of an image sensor, with optical imaging using a wavelength spectrum selection portion that selectively allows a plurality of wavelength spectra different from one another from a surface of the subject to pass. The discrimi-
(Continued)

nating includes discriminating the surface state of the subject based on a direction of the color vector in the color coordinate system.

9 Claims, 10 Drawing Sheets

(56) References Cited

U.S. PATENT DOCUMENTS

| | | | |
|---|---|---|---|
| 10,620,389 | B1 | 4/2020 | Kamikawa et al. |
| 10,732,102 | B2 | 8/2020 | Ohno et al. |
| 10,812,786 | B2 | 10/2020 | Ohno et al. |
| 10,901,134 | B2 | 1/2021 | Ohno et al. |
| 2015/0130925 | A1 | 5/2015 | Park et al. |
| 2017/0319052 | A1* | 11/2017 | Yasugi ............... A61B 1/00009 |
| 2018/0047208 | A1* | 2/2018 | Marin ................. H04N 13/257 |
| 2019/0364267 | A1* | 11/2019 | Ohno .................. H04N 17/002 |
| 2020/0150326 | A1 | 5/2020 | Kano et al. |
| 2021/0131961 | A1* | 5/2021 | Ohno .................. G01N 21/474 |
| 2021/0293537 | A1 | 9/2021 | Ohno et al. |
| 2022/0084240 | A1 | 3/2022 | Ohno et al. |
| 2022/0086326 | A1 | 3/2022 | Ohno et al. |
| 2022/0146435 | A1 | 5/2022 | Ohno |

FOREIGN PATENT DOCUMENTS

| | | |
|---|---|---|
| JP | 2008-209726 A | 9/2008 |
| JP | 5268094 B2 | 8/2013 |
| JP | 2014-191920 A | 10/2014 |
| JP | 2014-526706 A | 10/2014 |
| JP | 2016-148540 A | 8/2016 |
| JP | 2017-4215 A | 1/2017 |
| JP | 2019-124542 A | 7/2019 |
| JP | 2019-203796 A | 11/2019 |
| JP | 2020-46232 A | 3/2020 |
| JP | 2020-76717 A | 5/2020 |
| JP | 2020-122702 A | 8/2020 |
| JP | 2021-76423 A | 5/2021 |
| JP | 2021-148531 A | 9/2021 |
| JP | 2020-49881 A | 3/2022 |
| JP | 2022-049047 A | 3/2022 |
| JP | 2022-49047 A | 3/2022 |
| JP | 2022-049881 A | 3/2022 |
| JP | 2022-75314 A | 5/2022 |

OTHER PUBLICATIONS

J. Kim et al., "Multiaperture telecentric lens for 3D reconstruction," Optics Letters, vol. 36, No. 7, pp. 1050-1052 (2011).
Japanese Patent Office, Office Action in JP App. No. 2021-149457, 3 pages, with machine translation, 4 pages (Jun. 25, 2024).
Japan Patent Office, Office Action in JP App. No. 2021-149457, 3 pages, with machine translation, 2 pages (Sep. 10, 2024).

* cited by examiner

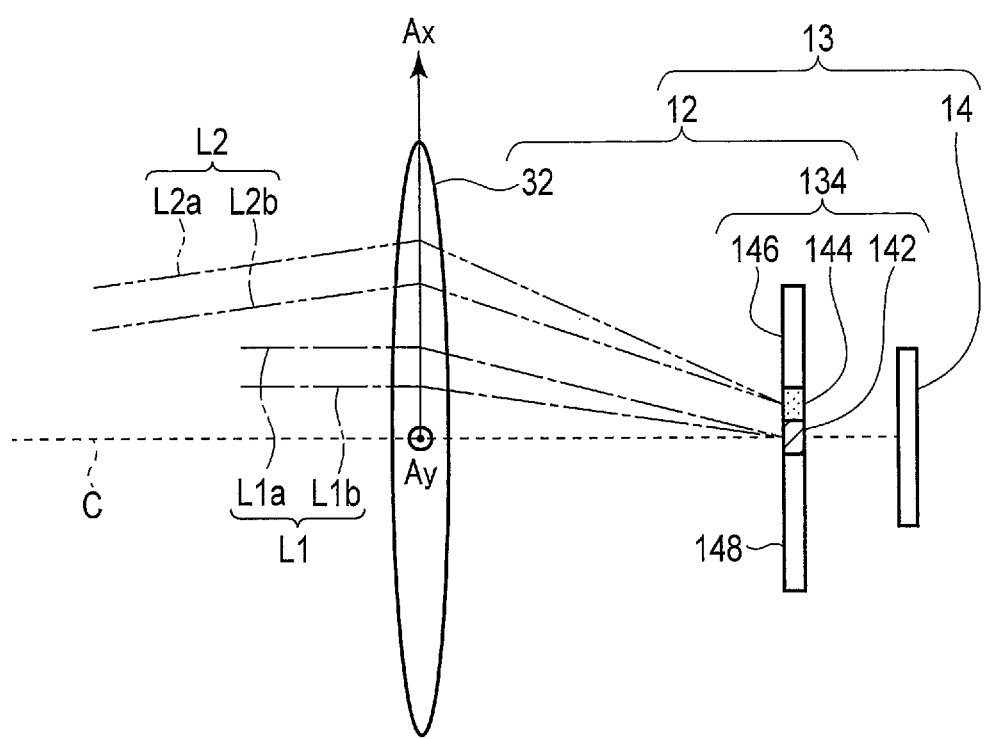
F I G. 13

OPTICAL INSPECTION METHOD, NON-TRANSITORY STORAGE MEDIUM STORING OPTICAL INSPECTION PROGRAM, PROCESSING DEVICE, AND OPTICAL INSPECTION APPARATUS

CROSS-REFERENCE TO RELATED APPLICATIONS

This application is based upon and claims the benefit of priority from Japanese Patent Application No. 2021-149457, filed Sep. 14, 2021, the entire contents of all of which are incorporated herein by reference.

FIELD

Embodiments described herein relate generally to an optical inspection method, a non-transitory storage medium storing an optical inspection program, a processing device, and an optical inspection apparatus.

BACKGROUND

For example, the surface of a subject is obtained with a normal camera and a surface state of the subject is inspected based on an obtained image of the surface of the subject.

BRIEF DESCRIPTION OF THE DRAWINGS

FIG. 13 is a schematic sectional view of the camera of the optical inspection apparatus of the optical inspection system illustrated in FIG. 12 when viewed from a first plane including an optical axis;

DETAILED DESCRIPTION

An object of an embodiment is to provide an optical inspection method, a non-transitory storage medium storing an optical inspection program, a processing device, and an optical inspection apparatus capable of inspecting a surface state of a subject.

According to the embodiment, an optical inspection method for a surface state of a subject includes acquiring, and discriminating. The acquiring includes acquiring a color vector of a color corresponding to a wavelength spectrum (or single wavelength) in a color coordinate system of n dimensions (n is a natural number equal to or larger than 1), which is equal to or smaller than a number of a plurality of color channels of pixels of an image sensor, with optical imaging using a wavelength spectrum selection portion that selectively allows a plurality of wavelength spectra different from one another from a surface of the subject to pass. The discriminating includes discriminating the surface state of the subject based on a direction of the color vector in the color coordinate system.

First Embodiment

An optical inspection system 2 according to the present embodiment is explained with reference to FIGS. 1 to 8.

Figure 1:
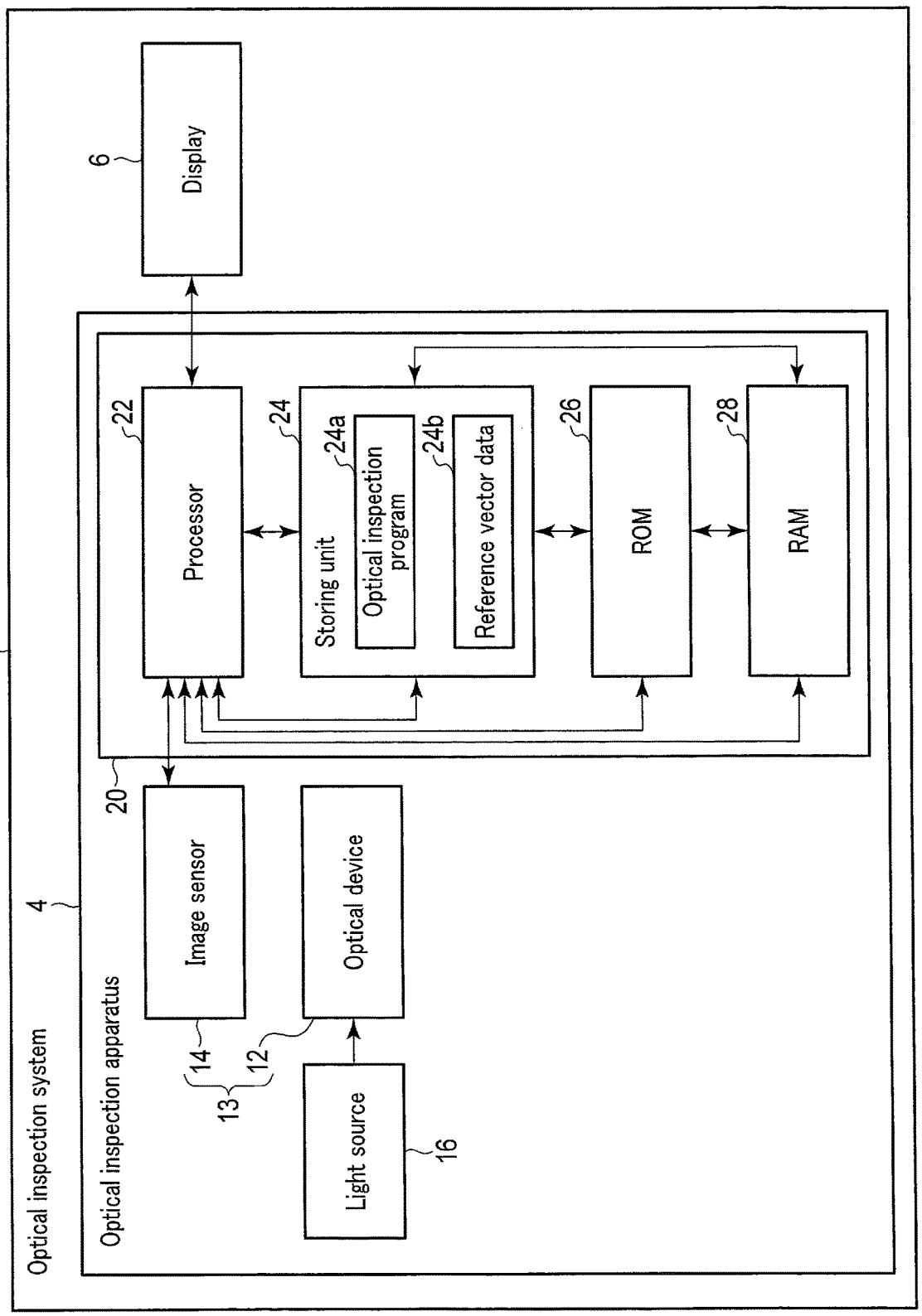
FIG. 1 is a schematic block diagram illustrating an optical inspection system according to a first embodiment to a third embodiment.

FIG. 1 is a block diagram illustrating an example of a configuration of the optical inspection system 2 according to the present embodiment. As illustrated in FIG. 1, the optical inspection system 2 includes an optical inspection apparatus 4 and a display 6.

The optical inspection apparatus 4 includes an optical device 12, an image sensor (an imaging unit) 14, a light source 16, a beam splitter 18, and a processing device 20.

Figure 2:
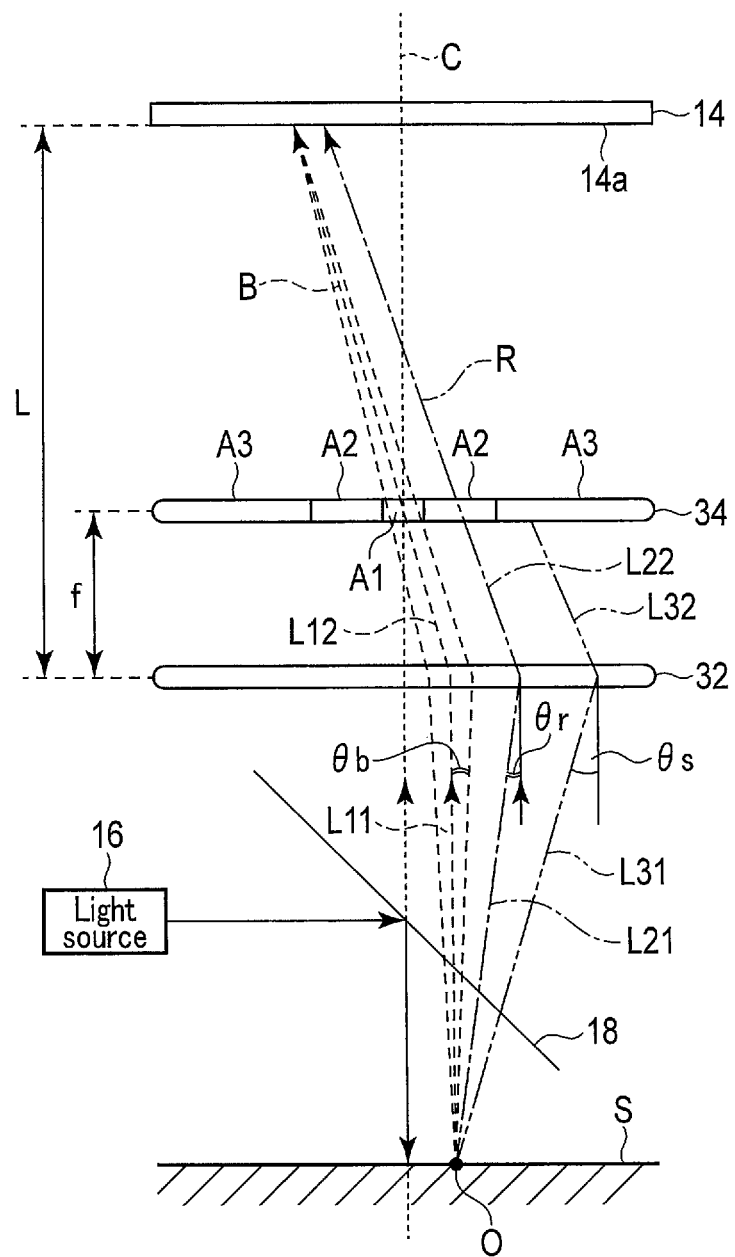
FIG. 2 is a schematic diagram illustrating a part of an optical inspection apparatus of the optical inspection system according to the first embodiment and the second embodiment.

As illustrated in FIG. 2, the optical device 12 includes an imaging optical system (an imaging lens) 32 and a color filter (a wavelength spectrum selection portion) 34.

The imaging optical system 32 is formed by one lens or combining a plurality of lenses. The imaging optical system 32 may be any lens that forms an image with light, such as a single lens, a set lens, a refractive index gradient type lens, a diffraction type lens, a light guide type lens, or a reflection type mirror. Here, the light is a form of electromagnetic waves. The electromagnetic waves include, for example, X-rays, ultraviolet rays, visible light, infrared rays, far infrared rays, millimeter waves, terahertz waves, microwaves, and the like. In the present embodiment, it is assumed that the light is visible light, and for example, the wavelength spectra of the light is in a region of 400 nm to 760 nm.

The imaging optical system 32 forms an image of a ray from a subject. In the present embodiment, the color filter 34 is disposed on a focal plane at a distance f with respect to the imaging optical system 32 to be rotationally symmetrical with respect to the optical axis of the imaging optical system 32. An optical axis C of the imaging optical system 32 coincides with the optical axis (the central axis) of the color filter 34. However, the color filter 34 does not need be placed on the focal plane and may be disposed on the inside or the outside of the imaging optical system 32 and may be disposed anywhere on the front side, the rear side, or the inside of the imaging optical system 32. By disposing the color filter 34 on the focal plane of the imaging optical system 32 as in the present embodiment, there is an effect that a relation between a color and a direction can be fixed over the entire surface of a captured image.

Figure 3:
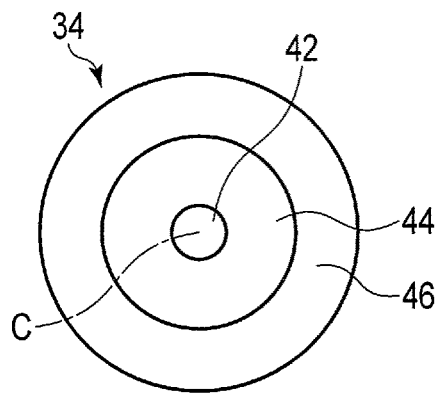
FIG. 3 is a schematic diagram illustrating a color filter of a camera of the optical inspection apparatus illustrated in FIG. 2.

As illustrated in FIG. 3, in the present embodiment, the color filter 34 includes a first wavelength spectrum selection filter (a wavelength spectrum selection region) 42, a second wavelength spectrum selection filter (a wavelength spectrum selection region) 44, and a ray blocking section 46 in order from the center side toward the radial outside. Hereafter, a wavelength spectrum is sometimes referred to simply as a wavelength. A wavelength spectrum selection is also sometimes referred to simply as a wavelength selection. The first wavelength spectrum selection filter 42, the second wavelength spectrum selection filter 44, and the ray blocking section 46 are concentrically formed. However, the wavelength spectrum selection regions are not limited thereto, and may have any shape. That is, the color filter 34 only has to have at least two different wavelength spectrum selection regions. Here, the ray blocking section 46 is considered as a wavelength spectrum selection region that blocks a wavelength range of visible light.

The first wavelength spectrum selection filter 42 is formed in a disk shape. The first wavelength spectrum selection filter 42 is provided on the optical axis C of the imaging optical system 32. The first wavelength spectrum selection filter 42 allows a ray having a first wavelength spectrum from a subject S, which has passed through the imaging optical system 32, to pass. The first wavelength spectrum is within a first wavelength range. Note that the first wavelength spectrum selection filter 42 has a characteristic of not transmitting but blocking a ray in a range different from the first wavelength range.

The second wavelength spectrum selection filter 44 is annularly formed in the outer circumference of the first wavelength spectrum selection filter 42. The second wavelength spectrum selection filter 44 allows a ray having a second wavelength spectrum different from the first wavelength spectrum from the subject S, which has passed through the imaging optical system 32, to pass. The width in the radial direction of the second wavelength spectrum selection filter 44 can be set as appropriate. The second wavelength is within a second wavelength range. Note that the second wavelength spectrum selection filter 44 has a characteristic of not transmitting but blocking a ray having a wavelength different from the second wavelength range.

Therefore, the wavelength spectrum selection filters 42 and 44 of the color filter 34 have a characteristic of, in each of the wavelength spectrum selection filters 42 and 44, transmitting a ray having a specific wavelength (or in a specific wavelength range; a wavelength spectrum) and blocking rays having wavelengths deviating from the specific wavelength range. Note that the first wavelength spectrum and the second wavelength spectrum are respectively included in appropriate ranges, that is, the first wavelength range and the second wavelength range. However, it is preferable that the wavelengths do not overlap each other. Accordingly, in the present embodiment, the first wavelength range and the second wavelength range are independent from each other.

The ray blocking section 46 is formed in the outer circumference of the second wavelength spectrum selection filter 44. The ray blocking section 46 is formed of, for example, a black plate and holds the second wavelength spectrum selection filter 44. The ray blocking section 46 blocks rays having all wavelengths in a visible light range made incident on the imaging optical system 32. The width in the radial direction of the ray blocking section 46 can be appropriately set. FIG. 3 illustrates an example in which the ray blocking section 46 is annular. However, the outer edge of the ray blocking section 46 may have any shape such as a rectangular shape. The ray blocking section 46 only has to be able to hold the second wavelength spectrum selection filter 44.

The radius of the outer circumference of the first wavelength spectrum selection filter 42 of the color filter 34 is represented as r1 and the radius of the outer circumference of the second wavelength spectrum selection filter 44 is represented as r2. At this time, r2>r1. Here, a region within the radius r1 of the first wavelength spectrum selection filter 42 is represented as A1. A region between the outer circumference of the first wavelength spectrum selection filter 42 and the outer circumference of the second wavelength spectrum selection filter 44 is represented as A2. The radius r1 of the first wavelength spectrum selection filter 42 and r2−r1, which is the distance between the outer circumference of the first wavelength spectrum selection filter 42 and the outer circumference of the second wavelength spectrum selection filter 44, can be set as appropriate. More specifically, the radius r1 of the first wavelength spectrum selection filter 42 of the color filter 34 and the radius r2 of the second wavelength spectrum selection filter 44 can be changed. Therefore, the shapes and sizes of the regions A1 and A2 can change.

As an example, the radius r1 of color filter 34 is approximately 1.5 mm, and radius r2 is approximately 12 mm.

The image sensor 14 is disposed on an optical path of light that has passed through the imaging optical system 32 and the color filter 34. The image sensor 14 includes a light receiving unit (a light receiving surface) 14a functioning as an image forming surface at a distance L (>f) with respect to the imaging optical system 32. The optical device 12 and the image sensor 14 configure a so-called camera (an imaging portion) 13.

As the image sensor 14, for example, an imaging element such as a CCD or a CMOS can be used. The image sensor 14 includes a plurality of pixels. The image sensor 14 has a plurality of color channels that divide at least two wavelengths different from each other in the pixels. Usually, the image sensor 14 includes an R channel, a G channel, and a B channel in the pixels. Accordingly, the image sensor 14 can acquire a color image and divide three wavelengths different from one another.

The pixels of the image sensor 14 may respectively identify single colors and identify different colors with different pixels. In that case, at least two pixels corresponding to the different colors are regarded as a set of pixels. The set of pixels is simply referred to as pixels.

The light source 16 is used for illuminating the surface of the subject S. As the light source 16, for example, an LED can be used. The beam splitter 18 is disposed between the subject S and the imaging optical system 32. As the beam splitter 18, for example, a half mirror can be used.

When light from the light source 16 is made incident on the beam splitter 18, the light is reflected toward the subject S and illuminates the surface of the subject S. A part of the light from the surface of the subject S is transmitted through the beam splitter 18 and is incident on the image sensor 14 through the imaging optical system 32 and the color filter 34.

In the present embodiment, for simplification of explanation, for example, the color filter 34 transmits, in visible light, light in a certain wavelength range for each of the wavelength spectrum selection filters 42 and 44 and blocks a wavelength deviating from the certain wavelength range, that is, prevents transmission of the wavelength.

Here, it is assumed that the first wavelength is blue (B) light and the second wavelength is red (R) light. In the present embodiment, for convenience, it is assumed that the wavelength of the red (R) light is 700 nm and the wavelength of the blue (B) light is 435 nm as determined by the International Commission on Illumination (CIE: Commission Internationale de l'Eclairage).

In the present embodiment, the region A1 of the first wavelength spectrum selection filter 42 allows, in the visible light, for example, the blue light (435 nm) and the B light having the first wavelength spectrum (for example, 400 nm to 500 nm) in the vicinity of the blue light to pass and blocks lights having the other wavelengths. In the present embodiment, the region A2 of the second wavelength spectrum selection filter 44 allows, in the visible light, for example, the red light (700 nm) and the R light having the second wavelength spectrum (for example, 600 nm to 700 nm) in the vicinity of the red light to pass and blocks lights having the other wavelength spectra. Note that, in the present embodiment, it is preferable that the range of the first wavelength spectrum allowed to pass by the region A1 of the first wavelength spectrum selection filter 42 and the range of the second wavelength spectrum allowed to pass by the region A2 of the second wavelength spectrum selection filter 44 do not overlap each other. Accordingly, the first wavelength spectrum selection region does not allow the lights having the second wavelength spectrum and wavelength spectra around the second wavelength spectrum to pass and blocks the lights. The second wavelength spectrum selection region does not allow the lights having the first wavelength spectrum and wavelength spectra around the first wavelength spectrum to pass and blocks the lights.

Note that the wavelength of the green (G) light determined by the International Commission on Illumination is 546 nm and is a wavelength between the R light and the B light. Accordingly, the wavelength spectra of the R light and the B light less easily overlap than when the wavelengths of the R light and the G light are used or when the wavelength spectra of the G light and the B light are used.

For example, a general-purpose computer is used as the processing device 20. The processing device 20 includes, for example, a processor 22, a storing unit 24, a read only memory (ROM) 26, and a random access memory (RAM) 28.

The processing device 20 may be capable of communicating with the image sensor 14 by wire or radio. The processing device 20 may be included in, for example, the camera 13.

The processor 22 is connected to the image sensor 14 and the storing unit 24. The processor 22, the ROM 26, and the RAM 28 are connected via, for example, a bus. The storing unit 24, the ROM 26, and the RAM 28 are capable of communicating with the processor 22 each other.

Note that the processing device 20 may be present on the outside of the optical inspection apparatus 4. In this case, an output of the image sensor 14 may be output to the outside of the optical inspection apparatus 4 or may be recorded in a storing unit on Cloud. That is, the calculation of the information concerning the subject S may be performed on the inside of the optical inspection apparatus 4 or may be performed on the outside of the optical inspection apparatus 4.

The processor 22 includes an integrated circuit such as a central processing unit (CPU), a GPU, or an application specific integrated circuit (ASIC). The processor 22 is not limited to be provided as a dedicated circuit and may be provided as a program executed by a computer. In this case, the program is recorded in a storage region, a storing unit, or the like in the integrated circuit.

The processor 22 may be present in a server in a Cloud service that transmits and receives data via a network.

The processor 22 has a function of an image processing unit for image data (RGB image data Irgb, R image data Ir, G image data Ig, and B image data Ib) captured by the image sensor 14. The processor 22 calculates information concerning the subject S based on the output of the image sensor 14. Note that the image data acquired by the image sensor 14 is output from at least two or more pixels.

For example, the storing unit 24 stores various programs. For example, the processor 22 writes various programs stored in the storing unit 24 in the RAM 28 and executes the various programs to thereby exert a function conforming to the program.

The various programs do not always need to be stored in the storing unit 24. The processor 22 can execute the various programs on a server via a network.

The storing unit 24 is a non-transitory storage medium. The storing unit 24 is, for example, a non-volatile memory writable and readable at any time such as a hard disk drive (HDD) or a solid state drive (SSD) or a non-volatile memory such as a read only memory (ROM). Examples of the storing unit 24 include a magnetic disk, an optical disc (e.g. CD-ROM, CD-R, DVD), a magneto-optical disc (e.g. MO), and a semiconductor memory. In the optical inspection apparatus 4, each of the number of processors and the number of non-transitory storage media may be one or plural. As the storing unit 24 in which these nonvolatile memories may be used in combination, for example, a Cloud memory may be used. The storing unit 24 stores, for example, an optical inspection program (algorithm) 24a according to the present embodiment and a plurality of reference vector data 24b different from one another corresponding to setting of the camera 13 (setting of the color filter 34 with respect to the optical axis C). The optical inspection program 24a may be stored in the ROM 26.

The optical inspection program 24a may be installed in the optical inspection apparatus 4 in advance, may be stored in a nonvolatile storage medium, or may be distributed via a network. The optical inspection program 24a may be present on the outside of the optical inspection apparatus 4 such as an appropriate server. In the present embodiment, the optical inspection program 24a causes the computer to calculate a color vector Cn (n indicates a dimension) based on image data (pixel values) of pixels acquired within the entire range or a predetermined range of the light receiving unit 14a of the image sensor 14, compare the color vector Cn with, for example, reference vector data 24b stored in the storing unit 24, and calculate a surface state of the subject S. Note that the color vector has direction as well as magnitude, which is not a scalar having only magnitude.

For example, the storing unit 24 stores a relation between the optical axis C of the imaging optical system 32 and the color filter 34. The relation between the optical axis C of the imaging optical system 32 and the color filter 34 includes, for example, transmission wavelength spectra, blocking wavelength spectra, and disposition of the first wavelength spectrum selection filter 42, the second wavelength spectrum selection filter 44, and the ray blocking section 46 of the color filter 34. Note that the optical inspection program 24a is capable of acquiring the relation between the optical axis C of the imaging optical system 32 and the color filter 34 by including a program for acquiring information concerning the optical device 12 and/or the camera 13.

Note that, for example, a display 6 is connected to the processor 22. The display 6 displays various kinds of information based on the processing of the processor 22. The display 6 displays, for example, an image captured by the image sensor 14 and also displays a determination result of a surface state of the subject S explained below.

Note that the surface state of the subject S includes various states such as a planar state of a surface of the entire surface or a predetermined range of the subject S, a flaw or a rough surface of the region to be inspected, and the like, the presence or absence of a portion to be detected (an abnormal portion) S2 that the processing device 20 is caused to detect and determine a surface state thereof, and the surface roughness (roughness)/gloss (see a second embodiment).

The operation of the optical inspection system 2 according to the present embodiment is explained.

When the surface of the subject S is inspected, the processor 22 of the processing device 20 causes the camera 13 to image the surface of the subject S in a state in which the surface of the subject S is illuminated by illumination light from the light source 15.

The imaging optical system 32 focuses an object point at an image point. A first object point O1 is set on a standard surface S1 of the surface of the subject S and a second object point O2 is set on a portion to be detected S2. Light made incident on the first object point O1 is reflected as first reflected light. Light made incident on the second object point O2 is reflected as second reflected light. The light from the first object point O1 is transferred to a first image point by the imaging optical system 32. The light from the second object point O2 is transferred to a second image point by the imaging optical system 32. It is assumed that the first image point and the second image point are present on the image sensor 14.

Figure 4:
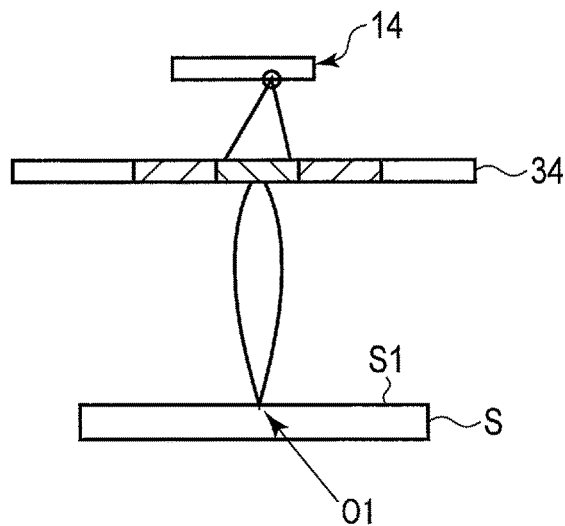
FIG. 4 is a schematic view illustrating a camera, an imaging optical system of which is not illustrated, and illustrating a transmission state of a ray from a color filter to an image sensor at the time when a surface state of a subject is a standard surface.
Figure 6:
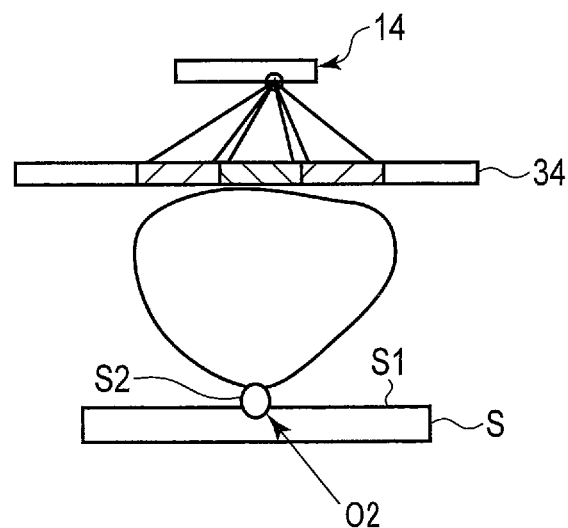
FIG. 6 is a schematic diagram illustrating the camera, the imaging optical system of which is not illustrated, and illustrating a transmission state of the ray from the color filter to the image sensor at the time when the surface state of the subject has a portion to be detected on the standard surface.

Since the first object point O1 is present on the standard surface S1 having a mirror surface shape, the light has more specular components (specular reflection components). That is, light distribution of the light from the first object point O1 tends to be narrow angle distribution as illustrated in FIG. 4. Since the second object point O2 is present on, for example, a rough surface, which is not a mirror surface, the light has more diffusion components. That is, light distribution of the light from the second object point O2 tends to have a wide angle distribution as illustrated in FIG. 6.

As illustrated in FIG. 2, for example, the illumination light from the light source 16 is reflected by the beam splitter 18 and illuminates the surface of the subject S. A ray (a spectral component) L11 specular-reflected at a certain object point O of the subject S on the surface of the subject S and rays L21 and L31 scattered at appropriate angles are refracted by the imaging optical system 32 and made incident on the color filter 34.

The region A1 of the first wavelength spectrum selection filter 42 of the color filter 34 of the camera 13 according to the present embodiment illustrated in FIG. 3 allows the B light from the subject S to pass but blocks the R light and the G light. The B light passing through the region A1 on the optical axis C of the imaging optical system 32 is a specular reflection light component of the surface of the subject S. The region A2 of the second wavelength spectrum selection filter 44 allows the R light from the subject S to pass but blocks the G light and the B light. The R light passing through the region A2 deviating from the optical axis C of the imaging optical system 32 is a scattered light component of the surface of the subject S. Note that the light made incident on a region A3 of the ray blocking section 46 is blocked.

In the optical device 12 according to the present embodiment, in rays emitted from any object point O of the subject S, the blue (B) light in which a main ray is parallel to the optical axis C is separated as a blue ray when the blue light is made incident on the imaging optical system 32 and the color filter 34. That is, the optical device 12 according to the present embodiment is a telecentric optical system having telecentricity for a blue ray. On the other hand, the optical device 12 according to the present embodiment is a non-telecentric optical system not having telecentricity for the red (R) light.

Therefore, what is made incident on the image sensor 14 as the B light and captured as the B image data (first image data) Ib by the image sensor 14 is mainly a specular reflection component. Note that the specular reflection component is not only a component completely parallel to the optical axis C. An appropriate deviation is allowed. In the present embodiment, the specular reflection component is in a range of 0≤θb illustrated in FIG. 2 when a direction along the optical axis C is represented as 0. Note that an angle θb can be appropriately set. The angle θb depends on the distance between the imaging optical system 32 and the color filter 34, the radius r1 of the region A1 of the first wavelength spectrum selection filter 42 of the color filter 34, and the like.

The region A2 of the second wavelength spectrum selection filter 44 of the color filter 34 of the camera 13 allows the R light having a first scattering angle θr (θb≤θg<θs) with respect to the optical axis C to pass but blocks the B light of the specular reflection light component and light having another second scattering angle θs (θs≤θ). Accordingly, what is made incident on the image sensor 14 as the R light and captured as the R image data (second image data) Ir by the image sensor 14 is only a component of the first scattering angle θr. The angle θr depends on the distance between the imaging optical system 32 and the color filter 34, the size of the region A2 of the second wavelength spectrum selection filter 44 of the color filter 34, and the like.

The angle θs depends on the distance between the imaging optical system 32 and the color filter 34, the size of the region A3 of the ray blocking section 46 of the color filter 34, and the like.

Accordingly, the RGB image data Irgb, the R image data Ir, (G image data Ig), and the B image data Ib captured by the image sensor 14 are colored according to a scattering angle (including specular reflection light) from the surface of the subject S. Accordingly, the color of the obtained RGB image data Irgb does not depend on the color of the surface itself of the subject S but depends on a wavelength spectrum selectively allowed to pass according to setting of the color filter 34. Accordingly, by setting the color filter 34 as appropriate, the RGB image data Irgb acquired by the camera 13 according to the present embodiment may be considered to be different from a color of an image of a normal camera that does not use the color filter 34 even if the image is an image of the surface of the same subject S.

In the present embodiment, the R light and the B light are made incident on the light receiving unit 14a of the image sensor 14 but the G light is blocked by the color filter 34 and is not made incident on the light receiving unit 14a of the image sensor 14. Accordingly, in the pixels of the light receiving unit 14a, light is received in the R channel and the B channel at an appropriate pixel value (for example, 256 gradations from 0 to 255) but light is not received in the G channel.

Here, a three-dimensional (orthogonal) coordinate system having pixel values of the R light, the G light, and the B light as outputs is set as a color coordinate system (a color space). Among the R channel, the B channel, and the G channel, in the present embodiment, the color filter 34 prevents light from being received in the G channel. Therefore, the output of the G light can be ignored. Accordingly, in the present embodiment, a two-dimensional (orthogonal) coordinate system having the respective pixel values of the R light and the B light as outputs is set as a color coordinate system.

FIG. 4 illustrates a positional relation between the camera 13 in which the imaging optical system 32 is not illustrated and the surface of the subject S. The surface of the subject S illustrated in FIG. 4 is a plane (hereinafter referred to as standard surface S1) having a normal parallel to the optical axis C having, for example, a mirror surface shape and no flaw.

In light made incident on the image sensor 14 through the color filter 34 of the camera 13, a ray from the standard surface S1 is generated by the B light passing on the optical axis C (on the region A1) of the color filter 34. Accordingly, the image sensor 14 obtains specular reflection light reflected from the standard surface S1 as a blue image in the B image data Ib. All of the B image data Ib of the standard surface S1 of the subject S illustrated in FIG. 4 are obtained as blue images.

Light from a position equivalent to the standard surface S1 is not substantially made incident on the image sensor 14 as the R light or, even if the light is incident on the image sensor 14, the intensity of the light is small enough to ignore a pixel value. Therefore, in the R image data Ir, an image of the standard surface S1 is black.

In the present embodiment, in the light made incident on the image sensor 14 through the color filter 34, the G light from the surface of the subject S is not made incident on the image sensor 14 or, even if the G light is incident on the image sensor 14, the intensity of the G light is small enough to ignore a pixel value. Therefore, the entire G image data Ig is black.

Therefore, the RGB image data Irgb obtained by the optical inspection apparatus 4 according to the present embodiment is colored according to direction information of a ray based on the color filter 34. The R image data Ir, the G image data Ig, and the B image data Ib obtained by separating the RGB image data Irgb into the color channels are respectively images based on surface information (unevenness information) of the subject S. As explained above, the optical inspection apparatus 4 according to the present embodiment acquires structure (unevenness) information of the subject S with an image captured by the image sensor 14.

Figure 5:
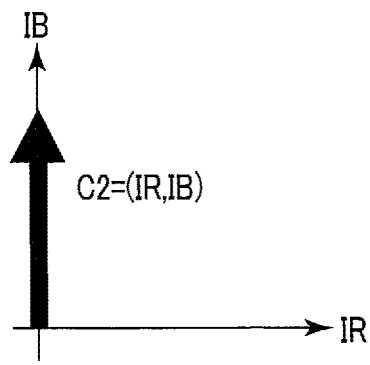
FIG. 5 is a schematic graph illustrating a color vector of a color coordinate system calculated from an image at the time when a surface state of a subject is the standard surface illustrated in FIG. 4, in the case that a pixel value IR of R light is plotted on a horizontal axis and a pixel value IB of B light is plotted on a vertical axis.

In FIG. 5, a two-dimensional color coordinate system in which the pixel value IR of the R light is plotted on a horizontal axis and the pixel value IB of the B light is plotted on a vertical axis is set. The processing device 20 causes the camera 13 to image the surface of the subject S. The processing device 20 plots the pixel values IR and IB of the R light and the B light acquired in all of the pixels or the pixels in the predetermined range of the light receiving unit 14a of the image sensor 14 in the graph of the color coordinate system illustrated in FIG. 5.

For example, in the graph of the color coordinate system, a vector is displayed as indicated by reference sign C2 in FIG. 5. In the present embodiment, this is referred to as color vector Cn (n is the number of dimensions).

In the present embodiment, the pixels of the light receiving unit 14a of the image sensor 14 include, for example, three different color channels of red (R), green (G), and blue (B). Because of the structure of the color filter 34, the G light is not received by the light receiving unit 14a of the image sensor 14. Accordingly, the color vector Cn can be indicated as C2 in two dimensions of the R light and the B light.

The color vector C2 is a vector having the pixel value IR of the R channel and the pixel value IB of the B channel respectively as components. That is, the color vector C2 can be represented as follows.

C2=(IR, IB)

The color vector C2=(IR, IB) corresponding to the object points O1 and O2 is calculated by the processing device 20.

In the image of the standard surface S1 of the subject S illustrated in FIG. 4, the B image data Ib is obtained as a blue image but the R image data Ir is a black image. That is, the color vector C2 corresponding to the first object point O1 has a large blue intensity component (IB). Accordingly, the color vector C2 illustrated in FIG. 5 extends from the origin along the vertical axis IB.

Note that the magnitudes of the pixel values IR and IB in the pixels mainly depend on the intensity of the illumination light, the distance between the camera and the surface of the subject S, and the like. The magnitudes of the pixel values IR and IB also depend on the relation between the color of the surface of the subject S and the color filter 34.

FIG. 6 illustrates a positional relation between the camera 13 in which the imaging optical system 32 is not illustrated and the surface of the subject S. On the surface of the subject S Illustrated in FIG. 6, a portion to be detected (defect) S2 such as a foreign matter or a flaw is present on a part of the standard surface S1. Here, the portion to be detected S2 means a defect that should be detected. That is, the portion to be detected S2 is a defect.

In light made incident on the image sensor 14 through the color filter 34 of the camera 13, a ray from the standard surface S1 is generated by the B light passing on the optical axis C (on the region A1) of the color filter 34. Accordingly, the image sensor 14 obtains specular reflection light reflected from the standard surface S1 as a blue image in the B image data Ib. Light from a position corresponding to the portion to be detected S2 is made incident on the image sensor 14 as the B light and the R light. Therefore, in the B image data Ib, the image of the standard surface S1 of the subject S is blue and the image of the portion to be detected S2 is blue and red.

Most of the portion to be detected S2 is not, for example, a region parallel to the standard surface S1. Alternatively, since the size of the portion to be detected S2 is close to or smaller than the wavelength spectrum of visible light, scattering due to a diffraction phenomenon of light is caused. For example, it is known that a rough surface having irregularities close to the wavelength of light scatters the light. In the light made incident on the image sensor 14 through the color filter 34, most of a ray from the portion to be detected S2 is made incident on the imaging optical system 32 as scattered light. Accordingly, the ray from the portion to be detected S2 is made incident on the image sensor 14 through the area A1 and the area A2 on the outer side of the color filter 34. That is, in the light made incident on the image sensor 14 through the color filter 34, a part of the ray from the portion to be detected S2 is generated by the R light passing on the region A2 deviating from the optical axis C of the color filter 34. Accordingly, the image sensor 14 obtains the scattered light from the portion to be detected S2 as a red image in the R image data Ir. Light from a position equivalent to the standard surface S1 is not made incident on the image sensor 14 as the R light. Therefore, in the R image data Ir, the image of the standard surface S1 is black and the image of the portion to be detected S2 is red. On the other hand, in the B image data Ib, the image of the standard surface S1 is blue and the image of the portion to be detected S2 is also blue.

In the present embodiment, in the light made incident on the image sensor 14 through the color filter 34, the G light from the surface of the subject S is not made incident. Therefore, the entire G image data Ig is black.

Therefore, the RGB image data Irgb obtained by the optical inspection apparatus 4 according to the present embodiment is colored according to direction information of a ray based on the color filter 34. The R image data Ir, the G image data Ig, and the B image data Ib obtained by separating the RGB image data Irgb into the color channels are respectively images based on surface information (unevenness information) of the subject S. As explained above, the optical inspection apparatus 4 according to the present embodiment acquires structure (unevenness) information of the subject S with an image captured by the image sensor 14.

Figure 7:
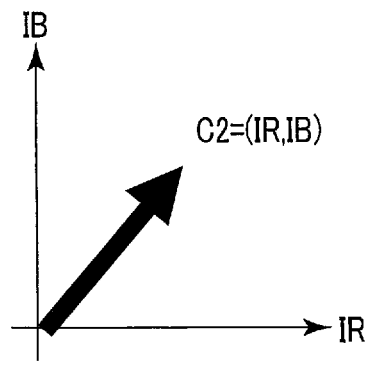
FIG. 7 is a schematic graph illustrating a color vector of a color coordinate system calculated from an image at the time when the surface state of the subject has the portion to be detected on the standard surface illustrated in FIG. 6, in the case that the pixel value IR of the R light is plotted on a horizontal axis and the pixel value IB of the B light is plotted on a vertical axis.

In FIG. 7, as in FIG. 5, a two-dimensional color coordinate system in which the pixel value IR of the R light is plotted on a horizontal axis and the pixel value IB of the B light is plotted on a vertical axis is set. The processing device 20 causes the camera 13 to image the surface of the subject S. The processing device 20 plots the pixel values IR and IB of the R light and the B light acquired in all of the pixels or the pixels in the predetermined range of the light receiving unit 14a of the image sensor 14 in the graph of the color coordinate system illustrated in FIG. 7. For example, in the graph of the color coordinate system, a vector is displayed as indicated by reference sign C2 in FIG. 7. The color vector C2 corresponding to the second object point O2 has both components of a blue intensity component (IB) and a red intensity component (IR).

Accordingly, the direction of the color vector C2 illustrated in FIG. 5 and the direction of the color vector C2 illustrated in FIG. 7 change according to the surface state of the subject S. Accordingly, the direction of the color vector C2 is greatly different depending on whether there is a fine defect. That is, presence or absence of a fine defect of object points can be identified according to the direction of the color vector C2.

For example, it is assumed that the standard surface S1 of the subject S illustrated in FIG. 4 is in a required product state (surface state). Then, the standard surface S1 of the subject. S illustrated in FIG. 4 is imaged and, when the processing device 20 outputs the color vector C2 corresponding to the standard surface S1 of the subject S illustrated in FIG. 4, this color vector C2 is set as a reference vector. This reference vector is stored, for example, in the storing unit 24 as one of the reference vector data 24b according to the structure of the color filter 34, that is, the structure of the camera 13.

Then, when the surface of the subject S including the standard surface S1 and the portion to be detected S2 illustrated in FIG. 6 is imaged and the processing device 20 outputs the color vector C2, the processing device 20 compares the directions of the reference vector and the color vector C2 stored in the storing unit 24. The processing device 20 can determine (output), based on whether the directions of the reference vector and the color vector C2 coincide or are different, whether the surface of the subject S is within or deviates from a range of a product state.

Note that the processing device 20 may provide a threshold (an allowable range) for allowing a deviation in the direction of the reference vector rather than determining the direction of the reference vector illustrated in FIG. 5 as one direction. The threshold is stored as, for example, a part of the reference vector data 24b of the storing unit 24 together with the reference vector. At this time, the processing device 20 can refer to the threshold together with the reference vector stored in the storing unit 24 and can determine (output), based on whether the direction of the color vector C2 with respect to the reference vector is within the range of the threshold or outside the range of the threshold, whether the surface of the subject S is within or deviates from the range of the required product state.

Figure 8:
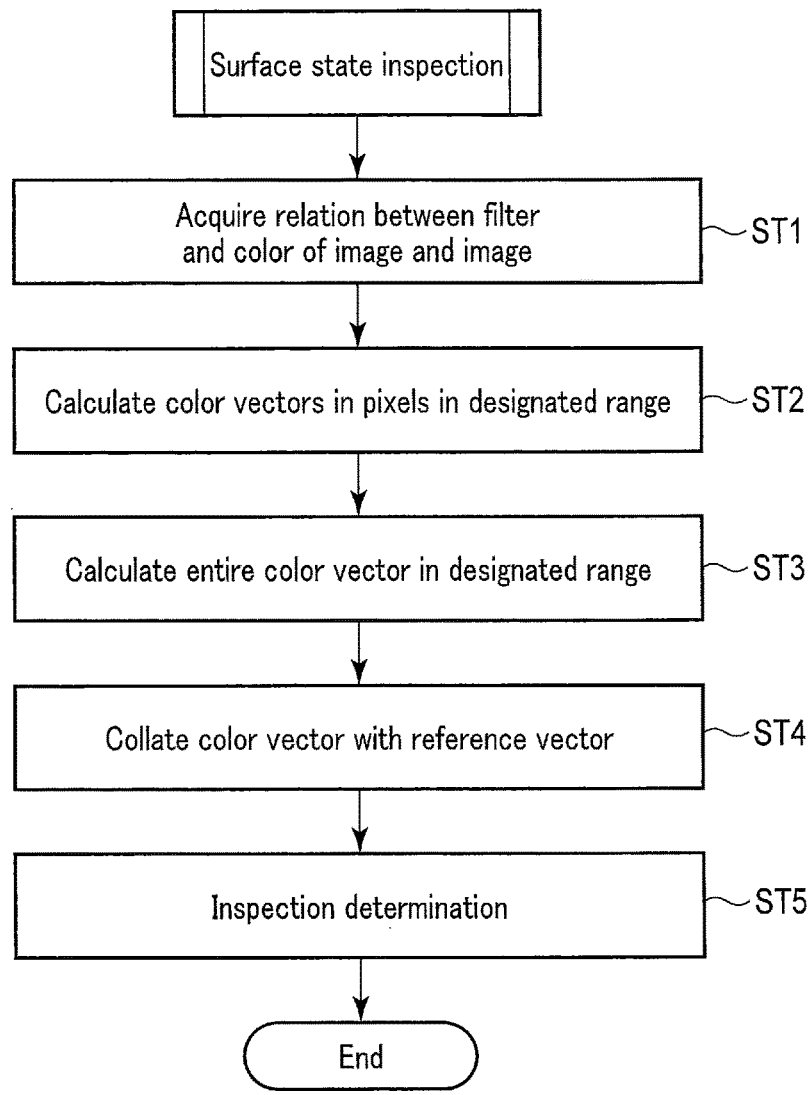
FIG. 8 is a flowchart illustrating processing for obtaining an inspection result of a surface state of a subject using the optical inspection apparatus of the optical inspection system according to the first embodiment to the third embodiment.

Such a series of processing for inspecting the surface state of the subject S by the processing device 20 is executed according to the flowchart of FIG. 8 using, for example, the program 24a stored in the storing unit 24.

The reference vector data 24b including the threshold is stored in advance in, for example, the storing unit 24. The relation between the color filter 34 and the wavelength received by the image sensor 14, that is, the structure of the camera 13 is stored in, for example, the storing unit 24. Note that the camera 13 may hold its own structure data and cause the processor 22 of the processing device 20 to recognize the structure of the camera 13 through communication with the processor 22 at the time of connection to the processing device 20. In this case, the structure of the camera 13 does not always need to be stored in the storing unit 24. The threshold can be changed as appropriate depending on the setting.

When a surface state of the subject S is inspected, the processor 22 acquires a relation between the color filter 34 and a wavelength received by the image sensor 14 and acquires an image with the image sensor 14 of the camera 13 (step ST1). At this time, the processor 22 causes the display 6 to display the image acquired by the image sensor 14 of the camera 13.

It is assumed that the surface of the subject S is, for example, in the state illustrated in FIG. 6. Most of the surface of the subject S in the example illustrated in FIG. 6 is the standard surface S1 on which light made incident on the image sensor 14 through the color filter 34 is made incident as specular reflection light. However, the portion to be detected S2 is formed in a part the surface of the subject S.

The processor 22 calculates a color vector of each of the pixels based on output gradations (pixel values) of the color channels (here, two channels of the R channel and the B channel) of the pixels in the entire range or a predetermined range of the light receiving unit 14a of the image sensor 14 (step ST2). Note that the processing device 20 determines a maximum dimension of the color coordinate system according to the acquisition of the relation between the color filter 34 and the color of the image obtained by the image sensor 14. In the present embodiment, the colors that can be acquired by the image sensor 14 are the three colors of R, G, and B. However, since the transmission wavelength spectra of the color filter 34 are two wavelength spectra of R and B, the color coordinate system is two-dimensional.

As explained above, the imaging optical system 32 focuses an object point at an image point. The processor 22 calculates color vectors C2 in the pixels (step ST3). That is, the processor 22 calculates directions (angles or inclinations) of the color vectors C2.

The processor 22 compares the calculated color vectors C2 acquired from the pixels with the reference vector of the reference vector data 24b (step ST4). That is, the processor 22 collates the directions (the angles or the inclinations) of the color vectors C2 with the direction (the angle or the inclination) of the reference vector that is the same as or the closest to the color vectors C2 from the reference vector data 24b.

The processor 22 outputs the surface state of the subject S as an inspection determination result based on whether it is within the threshold of the reference vector (step ST5). At this time, the processor 22 causes, for example, the display 6 to display the determination result. As illustrated in FIG. 5, it is assumed that the directions of color vectors respectively calculated from the pixels coincide with the reference vector illustrated in FIG. 5, for example, considering the threshold. At this time, the processing device 20 causes the display 6 to display a fact that the surface of the subject S is normal, for example, as a determination result. As illustrated in FIG. 7, it is assumed that a part of the directions of the color vectors calculated from the pixels deviate from the reference vector illustrated in FIG. 5, for example, considering the threshold. At this time, for example, the processing device 20 causes the display 6 to display the presence of the portion to be detected S2 as a determination result. Note that the processing device 20 may cause people around the optical inspection system 2 to recognize the determination result by sound. Besides, it is also suitable to use an inspection determination signal of the subject S in the processing device 20 as an operation trigger signal of a device that causes the subject S having the portion to be detected S2 to operate to separate from a line of the subject S determined as not having the portion to be detected S2.

As explained above, the processing device 20 determines the surface state (presence or absence of a defect) of the subject S.

The optical inspection program 24a may automatically perform steps ST1 to ST5, or a user may perform confirmation, for example, between steps ST1 and ST2, for example. When the user performs the confirmation in step ST1, an inspection range of the image can be set as appropriate. In steps ST2 to ST5, a surface state of the subject S in the set inspection range can be determined. The setting of the inspection range may maintain a predetermined state.

In the present embodiment, an example is explained above in which the color vectors C2 calculated by the processor 22 from the outputs of the pixels are compared with the reference vector of the reference vector data 24b in step ST4. However, for example, when the intensity of illumination light and the reflection intensity from the subject S are known in advance, a defect can also be detected by comparing only the intensity of the B light. Alternatively, for example, when the color filter 34 transmits only the B light and, as illustrated in FIG. 5, the image sensor 14 receives the B light and does not receive the G light and the R light, outputs of pixel values of the B channel of the pixels acquired by the image sensor 14 can be obtained. However, outputs of pixel values of the G channel and the B channel cannot be obtained or are negligibly small compared with the output of the pixel value of the B channel. In this case, the direction of a color vector can be identified as a direction along one dimension. Therefore, when the direction of the color vector can be identified as the direction along one dimension, it is not always necessary to compare the direction of the color vector with the direction of the reference vector. Accordingly, the processing device 20 can discriminate the surface state of the subject S based on the direction of the color vector in the color coordinate system even if the direction of the color vector is not always compared with the direction of the reference vector.

Note that, in the present embodiment, an example is explained above in which the color vectors C2 are respectively calculated from the pixels and the color vectors C2 are compared with the reference vector. For example, the processor 22 may calculate an average of pixel values and calculate one color vector C2 from one image. The processor 22 may compare the color vector C2 calculated by calculating the average of the pixel values with the reference vector.

Incidentally, ray intensities of the R image data Ir, the G image data Ig, and the B image data Ib acquired by the pixels of the image sensor 14 of the optical inspection apparatus 4 according to the present embodiment complementarily change when it is considered that a light amount of reflected light from an object point on the subject S is constant. That is, when the ray intensity of the R light in a certain pixel in a reflected ray from the subject S passing through the color filter 34 increases, the ray intensity of the B light (and the ray intensity of the G light) decreases in the pixel. When the ray intensity of the B light increases in another pixel, the ray intensity of the R light (and the ray intensity of the G light) decreases in the pixel. This is because the color and the direction of the reflected light are associated with each other. For example, an increase in the R light means that there are a lot of reflected light components in a direction corresponding to the R light and, at the same time, means that reflected light components in directions corresponding to the B light or the G light decrease.

In contrast, in the R image data, the G image data, and the B image data of the subject S imaged by a normal camera that do not pass through the color filter 34 explained in the present embodiment, the ray intensity of the R light, the ray intensity of the G image, and the ray intensity of the B light in a certain pixel only variously change according to a color of the subject S. There is no complementary relation explained above. This is because the color and the direction of the reflected light are not associated.

For example, even if the standard surface S1 having no flaw is imaged by a normal camera, the color vector explained in the present embodiment is not calculated in a direction parallel to the axis indicating the B light except when the standard surface of the subject S reflects only blue.

In contrast, the color vector C2 explained in the present embodiment is calculated in the direction of the vertical axis indicating the B light when the surface state is the standard surface S1 irrespective of whether the surface of the subject S reflects only blue. Accordingly, the direction of the color vector C2 of the standard surface S1 according to the present embodiment does not depend on the color of the subject S. If the surface of the subject S reflects a color other than blue even a little, that is, if red is reflected, as explained above, it is possible to detect a defect (the portion to be detected (a defect) S2) using the direction of the color vector C2 without being affected by the color of the subject S.

Therefore, it is possible to satisfactorily inspect, with the optical inspection apparatus 4 according to the present embodiment, the surface state of the subject S irrespective of the color of the subject S.

According to the present embodiment, an optical inspection method for the surface of the subject S includes acquiring a color vector of a color corresponding to a wavelength spectrum in a color coordinate system of n dimensions (n is a natural number equal to or larger than 1), which is equal to or smaller than the number of a plurality of color channels of the pixels of the image sensor 14, with optical imaging using the color filter (the wavelength spectrum selection portion) 34 that allows a plurality of wavelength spectra different from one another from the surface of the subject S to pass and discriminating a surface state of the subject S based on a direction of the color vector in the color coordinate system.

According to the present embodiment, it is suitable that the optical inspection method for the surface of the subject S includes associating the direction of the color vector in the color coordinate system and the color.

According to the present embodiment, the plurality of wavelength spectra different from one another has different directions of lights from the subject S.

According to the present embodiment, in the optical inspection method for the surface of the subject S, it is suitable that the discriminating the surface state of the subject S includes calculating the closeness of the directions of the color vector and the reference vector serving as a reference for discrimination of the surface state of the subject S in the pixels.

According to the present embodiment, the optical inspection program 24a for the surface of the subject S causes a computer to execute acquiring a color vector of a color corresponding to a wavelength spectrum in a color coordinate system of n dimensions (n is a natural number equal to or larger than 1), which is equal to or smaller than the number of a plurality of color channels of the pixels of the image sensor 14, with optical imaging using the color filter (the wavelength spectrum selection portion) 34 that allows a plurality of wavelength spectra different from one another from the surface of the subject S to pass and discriminating a surface state of the subject S based on a direction of the color vector in the color coordinate system.

As explained above, according to the present embodiment, it is possible to discriminate the surface state of the subject S based on the direction of the color vector of the color coordinate system calculated by performing optical imaging using the color filter 34 that allows a plurality of wavelength spectra different from one another from the surface of the subject S to pass. The direction of the color vector at this time depends on not the color of the subject S but irregularity information. Accordingly, the optical inspection method, the optical inspection program 24a, the processing device 20, and the optical inspection apparatus 4 according to the present embodiment can each satisfactorily inspect the surface state of the subject S.

Further, according to the present embodiment, the surface state of the subject S can be inspected by setting the reference vector of the predetermined color coordinate system, calculating the color vector of the predetermined color coordinate system from the image captured by the camera 13, and comparing the directions of the calculated color vector and the reference vector.

In the present embodiment, the G light from the surface of the subject S is set to be blocked by the color filter 34. By providing the region for allowing the G light to pass in the color filter 34, the G light can be received in the pixels of the light receiving unit 14a of the image sensor 14. In this case, the color coordinate system is three-dimensional. At this time, the reference vector is also three-dimensional. In the present embodiment, since the image sensor 14 capable of acquiring the three color lights of the R light, the G light, and the B light is used, the color coordinate system is three-dimensional at most. When the image sensor 14 uses, for example, a hyperspectral camera or the like capable of dividing and acquiring N colors (N is a natural number equal to or larger than 4), the color coordinate system is N-dimensional at most. That is, by setting an N-dimensional reference vector corresponding to the color filter 34 of the camera 13, the processing device 20 can determine whether the surface of the subject S is within a range of a required product state.

Note that, in general, a color vector can be defined for N independent color channels. That is, when pixel values of the N independent color channels are represented as I1, I2, . . . , and IN, the N-dimensional color vector can be represented as

CN=(I1, I2, . . . , IN).

A calculation time of the color vector C2 of the color coordinate system changes according to the number of pixels within a predetermined range, for example, a processing ability of the processor 22 of the processing device 20. When the calculation time increases, the output of the inspection result of the surface state of the subject S is delayed. Accordingly, an N-dimensional reference vector can be set at most as the color coordinate system or n-dimensional N (2≤n≤N and (n and N are natural numbers) smaller than the N-dimensional reference vector may be set.

As explained above, according to the present embodiment, it is possible to provide the optical inspection method, the optical inspection program 24a, the processing device 20, and the optical inspection apparatus 4 capable of satisfactorily inspecting the surface state of the subject S.

In the present embodiment, the color filter 34 is explained above as functioning as the first wavelength spectrum selection filter 42 on the imaging optical system 32 and allowing the blue (B) light to pass and blocking the red (R) light and functioning as the second wavelength spectrum selection filter 44 and allowing the red (R) light to pass and blocking the blue (B) light. For example, the color filter 34 may function as the first wavelength spectrum selection filter 42 and allow the red (R) light to pass and block the blue (B) light and may function as the second wavelength spectrum selection filter 44 and allow the blue (B) light to pass and block the red (R) light.

In the present embodiment, an example is explained above in which the color filter 34 uses the first wavelength spectrum selection filter 42 and the second wavelength spectrum selection filter 44. Instead of the first wavelength spectrum selection filter 42 and the second wavelength spectrum selection filter 44, the color filter 34 may be configured such that light having a wavelength to be transmitted continuously changes, for example, from the inside to the outside. That is, the color filter 34 may be configured to allow light having a certain wavelength spectrum to pass in an annular shape having a predetermined radius with respect to the central axis common in the annular shape from the inside to the outside but not to allow light having a wavelength spectrum different from the certain wavelength spectrum to pass in the position of the predetermined radius. For example, the color filter 34 may be configured to allow the blue (B) light to pass through the center of the color filter 34, increase a wavelength spectrum to be allowed to pass through the color filter 34 toward the radial outer direction, and allow the green (G) light to pass at the outermost edge of the color filter 34 (the inner side of the ray blocking section 46) of the color filter 34.

In the present embodiment, the image sensor 14 is explained as acquiring the RGB image. However, for example, a color channel having a wavelength corresponding to the transmission wavelength spectrum of the color filter 34 may be acquired. That is, as a wavelength of light received by the light receiving unit 14a of the image sensor 14, an appropriate wavelength spectrum deviating from the R light, the G light, and the B light is selected.

(Modification)

For example, the color filter 34 illustrated in FIG. 3 may block a position indicated by reference numeral 42 on the optical axis C, set a position indicated by reference numeral 44 as a first wavelength spectrum selection region through which, for example, the red (R) light is allowed to pass as light having a first wavelength spectrum, and set a position indicated by reference numeral 46 as a second wavelength spectrum selection region through which, for example, the blue (B) light is allowed to pass as light having a second wavelength spectrum.

In this case, the image sensor 14 acquires an image of the surface of the subject S with scattered light having a first scattering angle in the first wavelength spectrum having passed through the first wavelength spectrum selection region and scattered light having a second scattering angle in the second wavelength spectrum having passed through the second wavelength spectrum selection region. In this case, based on the image acquired by the image sensor 14, the processing device 20 calculates a color vector based on the scattered light rather than the specular reflection light component. The reference vector is set based on such a color filter 34.

Therefore, an image of the surface of the subject S can be obtained by acquiring, with the color filter (the wavelength spectrum selection portion) 34, a first wavelength spectrum in a ray of specular reflection light or scattered light in a ray from the surface of the subject S and a second wavelength spectrum different from the first wavelength spectrum in a ray of the scattered light from the surface of the subject S through optical imaging using the image sensor 14. A color vector is calculated from a pixel value of the first wavelength spectrum and a pixel value of the second wavelength spectrum in a color coordinate system of two dimensions same as or smaller than the number of a plurality of color channels of the pixels of the image sensor 14. The inspection of the surface state of the subject S can be performed using such a color vector.

Second Embodiment

A second embodiment is explained with reference to FIGS. 9 to 11. The present embodiment is a modification of the first embodiment. The same members or members having the same functions as the members explained in the first embodiment are denoted by the same reference numerals and signs as much as possible and detailed explanation of the members is omitted.

As the optical inspection system 2 according to the present embodiment, the optical inspection system 2 explained in the first embodiment can be directly used.

Figure 9:
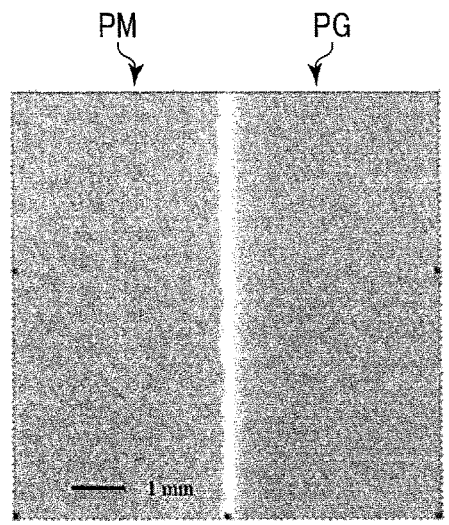
FIG. 9 is RGB image data obtained by imaging, as a subject, with a normal camera (an RGB camera), paper (left side) having a surface in a matte state and paper (right side) having a surface in a glossy state arranged side by side.

FIG. 9 illustrates RGB image data obtained by arranging paper PM having a surface in a matte state and paper PG having a surface in a glossy state and capturing an image using a normal camera (an RGB camera). The paper PM having the surface in the matte state and the paper PG having the surface in the glossy state are each generally used as photographic paper or the like.

Figure 10:
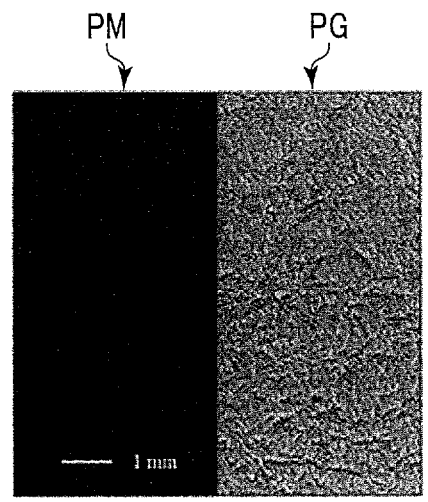
FIG. 10 is RGB image data obtained by imaging the subject illustrated in FIG. 9 using the camera of the optical inspection apparatus of the optical inspection system according to the second embodiment.

FIG. 10 illustrates RGB image data obtained by photographing the paper PM and the paper PG illustrated in FIG. 9 using the camera 13 of the optical inspection apparatus 4 according to the present embodiment.

For example, it is assumed that each of the surface of the paper PM having the surface in the matte state on the left side and the surface of the paper PG having the surface in the glossy state on the right side in FIG. 9 is obtained as a product of a certain manufacturer.

Figure 11:
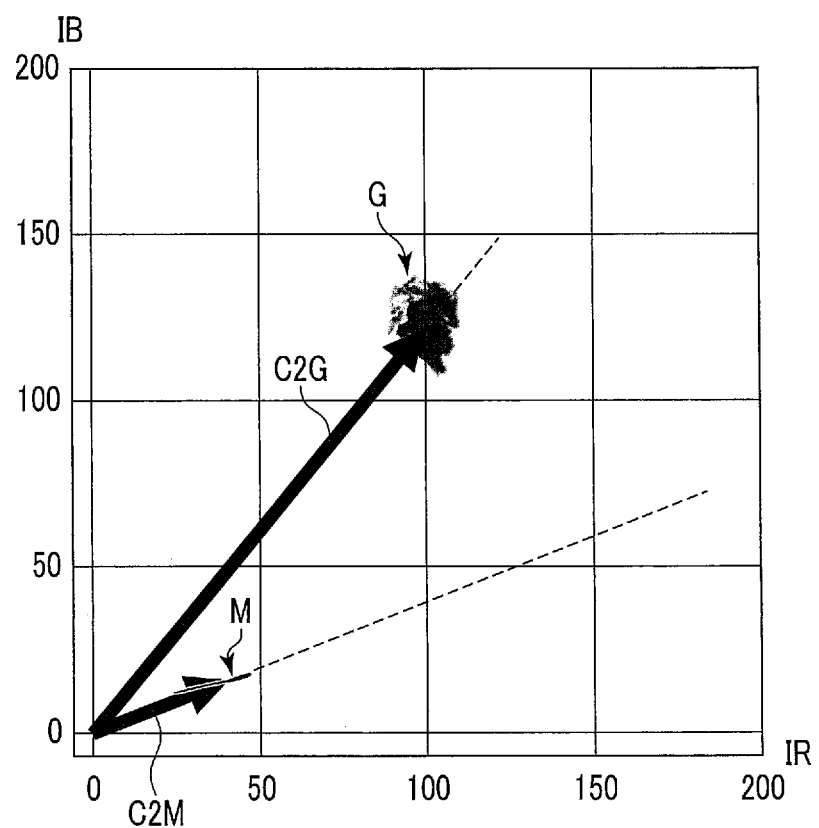
FIG. 11 is a schematic graph illustrating pixel value plots respectively obtained from an image of a surface of paper having a surface on which a surface state of the subject is the matte (matte) state illustrated in FIGS. 9 and 10 and an image of a surface of paper having a surface on which a surface state of the subject is the glossy state illustrated in FIGS. 9 and 10 and a color vector of a color coordinate system calculated from the respective pixel value plots at the time, in the case that the pixel value IR of the R light is plotted on a horizontal axis and the pixel value IB of the B light is plotted on a vertical axis.

In FIG. 11, a color coordinate system in which the pixel value IR of the R light is plotted on a horizontal axis and the pixel value IB of the B light is plotted on ae vertical axis is set. FIG. 11 illustrates a color vector C2M of an image of the surface of the paper PM having the surface in a desired matte state and a color vector C2G of an image of the surface of the paper PG having the surface in a desired gloss state, the color vector C2M and the color vector C2G being calculated by the processor 22 of the processing device 20. The processor 22 of the processing device 20 sets the color vector C2M of the image of the surface of the paper PM having the surface in the desired matte state as a first reference vector and sets the color vector C2G of the image of the surface of the paper PG having the surface in the desired glossy state as a second reference vector and stores the first and second reference vectors in, for example, the storing unit 24 as the reference vector data 24b. That is, as the reference vector data 24b in the present embodiment, two reference vectors are stored.

Note that the color vector C2G (the second reference vector) of the image of the paper PG having the surface in the glossy state as the surface of the subject S has a larger inclination (angle) compared with the color vector C2M (the first reference vector) of the image of the paper PM having the surface in the matte state as the surface of the subject S. This is presumed to be because the surface of the subject S has the surface in the glossy state, whereby more specular reflection light components are made incident on the image sensor 14 from the surface of the subject S compared with the surface in the matte state.

Such a series of processing for inspecting the surface state of the subject S by the processing device 20 is executed according to the flowchart of FIG. 8 using, for example, the program 24*a* stored in the storing unit 24. In addition, a threshold (an allowable range) concerning deviation in the direction of the first reference vector and a threshold (an allowable range) concerning deviation in the direction of the second reference vector are each set and stored in, for example, the storing unit 24. Here, it is assumed that the surface state of the subject S is the surface in the matte state.

When a surface state of the subject S is inspected, the processor 22 acquires a relation between the color filter 34 and a wavelength received by the image sensor 14 and acquires an image with the image sensor 14 of the camera 13 (step ST1). At this time, the processor 22 causes the display 6 to display the image (for example, see the left diagram in FIG. 10) acquired by the image sensor 14 of the camera 13.

The processor 22 calculates a color vector for each of the pixels based on output gradations (pixel values) IR and IB of color channels (here, two channels of the R channel and the B channel) of the pixels in the entire range or a predetermined range of the light receiving unit 14*a* of the image sensor 14 (step ST2). As illustrated in FIG. 11, an aggregate M of an infinite number of points is linearly illustrated.

The processor 22 calculates an average color vector C2M based on the aggregate M of the infinite number of points (step ST3). That is, the processor 22 calculates an angle or an inclination of the color vector C2M.

The processor 22 compares the calculated color vector C2M and the first reference vector and the second reference vector of the reference vector data 24*b* (step ST4). That is, the processor 22 collates the direction (the angle or the inclination) of the color vector with the direction (the angle or the inclination) of a reference vector same as or closest to the color vector C2M from a plurality of reference vector data.

Here, the surface state of the subject S is a surface in a matte state. The color vector C2M coincides with or substantially coincides with the direction of the first reference vector and is away from the direction of the second reference vector.

The processor 22 outputs the surface state of the subject S as an inspection determination result based on whether the surface state is within a threshold of the first reference vector (step ST5). At this time, the processor 22 causes, for example, the display 6 to display the determination result. For example, a difference in an angle (including a threshold) from the first reference vector is displayed on the display 6 in the matter state of the surface of the subject S.

It is assumed that a surface state of the subject S to be subsequently inspected is a surface in a glossy state.

When a surface state of the subject S is inspected, the processor 22 acquires a relation between the color filter 34 and a wavelength received by the image sensor 14 and acquires an image with the image sensor 14 of the camera 13 (step ST1). At this time, the processor 22 causes the display 6 to display the image (for example, see the right diagram in FIG. 10) acquired by the image sensor 14 of the camera 13.

The processor 22 calculates a color vector for each of the pixels based on output gradations (pixel values) IR and IB of color channels (here, two channels of the R channel and the B channel) of the pixels in the entire range or a predetermined range of the light receiving unit 14*a* of the image sensor 14 (step ST2). As illustrated in FIG. 11, an aggregate G of an infinite number of points is illustrated as a mass.

The processor 22 calculates an average color vector C2G based on the aggregate G of the infinite number of points (step ST3). That is, the processor 22 calculates an angle or an inclination of the color vector C2G.

The processor 22 compares the calculated color vector C2G and the first reference vector and the second reference vector of the reference vector data 24*b* (step ST4). That is, the processor 22 collates the direction (the angle or the inclination) of the color vector with the direction (the angle or the inclination) of a reference vector same as or closest to the color vector C2G from a plurality of reference vector data.

Here, a surface state of the subject S is a surface in a glossy state. The color vector C2G coincides with or substantially coincides with the direction of the second reference vector and is away from the direction of the first reference vector.

The processor 22 outputs the surface state of the subject S as an inspection determination result based on whether the surface state is within a threshold of the second reference vector (step ST5). At this time, the processor 22 causes, for example, the display 6 to display the determination result. For example, a difference in an angle (including a threshold) from the second reference vector is displayed on the display 6 in a glossy state of the surface of the subject S.

Although not illustrated, it is assumed that the direction of the color vector of the image of the surface of the subject S deviates from each of the first reference vector and the second reference vector considering the threshold. At this time, the processing device 20 displays a determination result that the surface of the subject S is not in a desired surface state, for example, on the display 6.

An inspection determination signal of the subject S in the processing device 20 can be used as, for example, an activation trigger signal for activating equipment that separates, as the subject S, paper having a surface in a matte state, paper having a surface in a glossy state, and other paper (paper, the surface of which is determined as not being in a desired surface state) into, for example, three lines.

In the present embodiment, an example is explained above in which a color vector calculated from images of the surfaces of two pieces of paper including the paper having the surface in the matte state and the paper having the surface in the glossy state illustrated in FIG. 9 is set as the reference vector. A color vector calculated from images of the surfaces of a large number of pieces of paper may be stored in the storing unit 24 as a reference vector. In this case, the processing device 20 can output (determine) surface roughness as the surface state of the surface of the subject S by comparing a color vector calculated from the image of the subject S captured by the camera 13 with, for example, the reference vector data 24*b* stored in the storing unit 24.

Therefore, the processing device 20 according to the present embodiment can inspect, for example, surface roughness in addition to the determination of the presence or absence of the portion to be detected S2 (see FIG. 6) and the like explained in the first embodiment by appropriately setting a plurality of reference vectors and comparing the reference vectors with a color vector calculated from the image of the subject S.

According to the present embodiment, it is possible to provide the optical inspection method, the optical inspection program 24*a*, the processing device 20, and the optical inspection apparatus 4 capable of satisfactorily inspecting the surface state of the subject S.

For example, various matte states and gloss states of the surface of the subject S are present. It is possible to determine the surface state in a stepwise or stepless manner by comparing the direction of the color vector Cn according to the present embodiment and the closest reference vector in the reference vector data.

(Modification)

For example, a color vector obtained from the image of the standard surface S1 illustrated in FIG. 4 is set as a first reference vector. Although not illustrated, a color vector along IR of the horizontal axis of the color coordinate system is assumed and the color vector is set as a second reference vector. The first reference vector and the second reference vector are stored in, for example, the storing unit 24. As an example, the first reference vector is a color vector corresponding to a specular reflection direction from the surface of the subject S and the second reference vector is a color vector corresponding to a scattering direction different from the specular reflection direction.

When a color vector is calculated from an image of a surface of a certain subject S, the processing device 20 may discriminate a state of the surface and a type of the surface according to whether the direction of the color vector is close to the first reference vector or close to the second reference vector.

In this way, the reference vector can be set as appropriate according to the subject S.

When the color filter explained in the modification of the first embodiment is used, as an example, the first reference vector is a color vector corresponding to a first scattering direction from the surface of the subject S and the second reference vector is a color vector corresponding to a second scattering direction different from the first scattering direction.

Third Embodiment

A third embodiment is explained with reference to FIGS. 12 to 14. The present embodiment is a modification of the first embodiment and the second embodiment. The same members or members having the same functions as the members explained in the first embodiment and the second embodiment are denoted by the same reference numerals and signs as much as possible and detailed explanation of the members is omitted.

Figure 12:
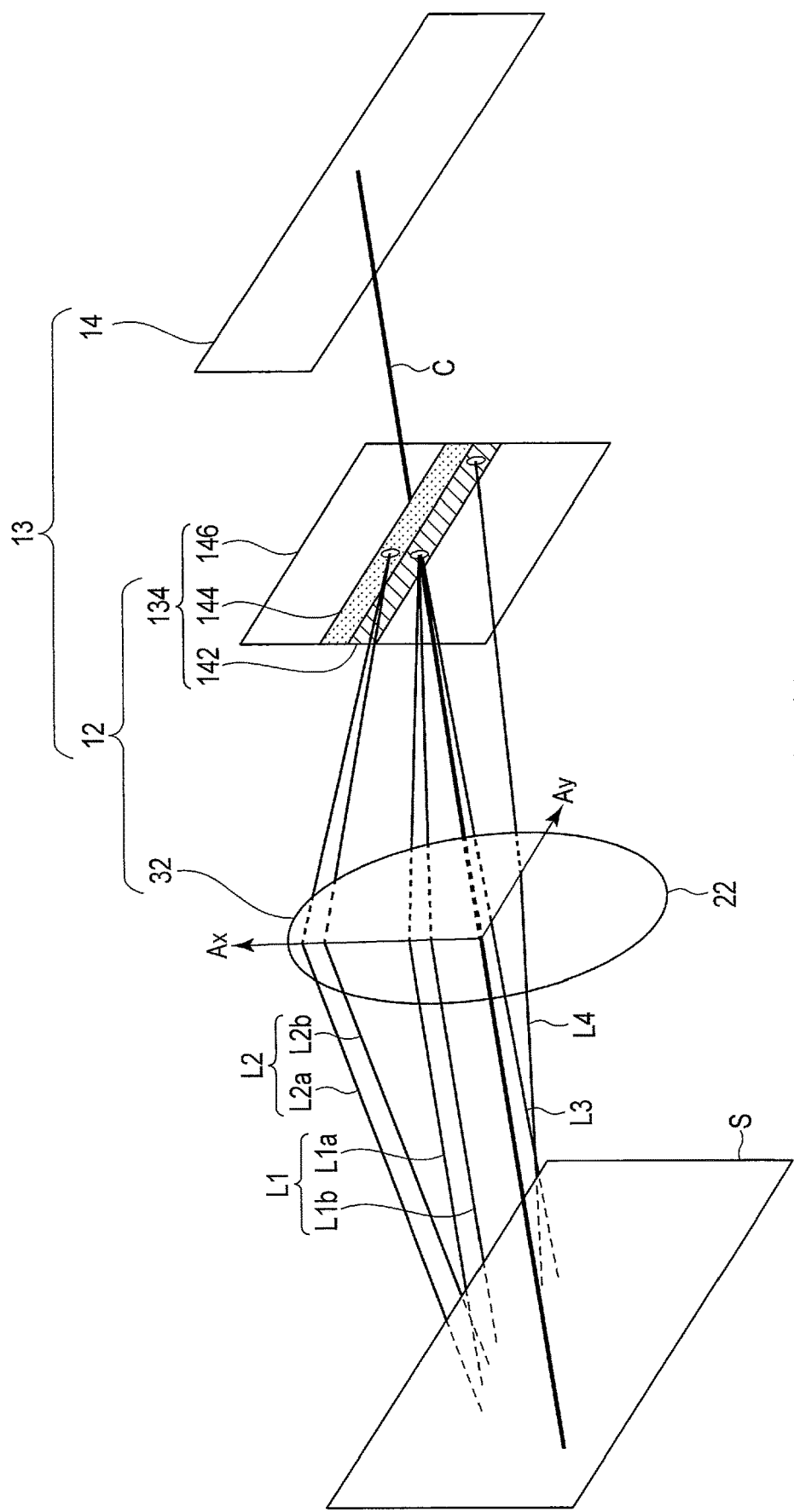
FIG. 12 is a schematic perspective view illustrating a camera of an optical inspection apparatus of an optical inspection system according to a third embodiment.

As illustrated in FIG. 12, the optical device 12 includes an imaging optical system 32 and a color filter 134. The color filter 134 is disposed on a focal plane at a distance f with respect to the imaging optical system 32. However, the color filter 134 may be disposed on the front side or the rear side of the imaging optical system 32. By arranging the color filter 134 on the focal plane of the imaging optical system 32, there is an effect that a relation between a color and a direction can fixed over an entire captured image.

Here, an example is explained above in which the color filter 34 of the optical device 12 of the optical inspection apparatus 4 according to the first embodiment and the second embodiment is rotationally symmetrical with respect to the optical axis C, that is, isotropic with respect to the optical axis C. However, rotationally symmetrical means that, when a shape is rotated with respect to an axis, the shape coincides with an original shape at a rotation angle of less than 360 degrees. In the present embodiment, an example in which the color filter 134 is anisotropic is explained.

The color filter 134 is formed in, for example, a rectangular shape having one direction (a direction parallel to a second axis Ay explained below) orthogonal to the optical axis C as a longitudinal direction. In the present embodiment, the color filter 134 selectively allows a first wavelength spectrum and a second wavelength spectrum different from the first wavelength spectrum to pass. The color filter 134 includes a first wavelength spectrum selection filter (wavelength spectrum selection region) 142 and a second wavelength spectrum selection filter (wavelength spectrum selection region) 144. Note that the periphery of the first wavelength spectrum selection filter 142 and the second wavelength spectrum selection filter 144 of the color filter 134 includes a ray blocking section 146. The ray blocking section 146 is formed of, for example, a black plate and holds the first wavelength spectrum selection filter 142 and the second wavelength spectrum selection filter 144.

Here, in the present embodiment, the first axis Ax is set to be orthogonal to the optical axis C of the imaging optical system 32. In the present embodiment, regions of the first wavelength spectrum selection filter 142 and the second wavelength spectrum selection filter 144 are divided along the axial direction of the first axis Ax. That is, when the first wavelength spectrum selection filter 142 is translated along the axial direction of the first axis Ax, the end portion of the first wavelength spectrum selection filter 142 can be superimposed on the end portion of the second wavelength spectrum selection filter 144. This is referred to as the first wavelength spectrum selection filter 142 and the second wavelength spectrum selection filter 144 being disposed to be shifted from each other in the first axis Ax. In the present embodiment, the second axis Ay is set in a direction orthogonal to both the first axis Ax and the optical axis C. In the present embodiment, the axial direction of the second axis Ay is along the longitudinal direction of the color filter 134.

The first wavelength spectrum selection filter 142 and the second wavelength spectrum selection filter 144 are each formed along the longitudinal direction of the color filter 134. The first wavelength spectrum selection filter 142 is disposed on the optical axis C. The first wavelength spectrum selection filter 142 is adjacent to the second wavelength spectrum selection filter 144. The first wavelength spectrum selection filter 142 and the second wavelength spectrum selection filter 144 of the color filter 134 are formed to be translationally symmetric to an axis parallel to the second axis Ay.

The first wavelength spectrum selection filter 142 allows a ray (a first ray) having a first wavelength spectrum to pass. For example, the first wavelength spectrum is the B light having blue light (435 nm) and a first wavelength spectra (400 nm to 500 nm) in the vicinity of the blue light. The second wavelength spectrum selection filter 144 allows a ray (a second ray) having a second wavelength spectrum to pass. The second wavelength spectrum is the R light having red light (700 nm) and a second wavelength spectra (600 nm to 700 nm) in the vicinity of the red light. The first wavelength spectrum selection filter 142 blocks a ray having a wavelength spectrum (including a second wavelength spectrum) different from the first wavelength spectrum. The second wavelength spectrum selection filter 144 blocks a ray having a wavelength spectrum (including the first wavelength spectrum) different from the second wavelength spectrum.

The image sensor 14 may be an area sensor or may be a line sensor. The image sensor 14 may include three color channels of R, G, and B in the pixels. Here, as illustrated in FIG. 12, it is assumed that the image sensor 14 is an area sensor and the pixels include two color channels of red and blue. That is, the image sensor 14 can receive the B light and the R light respectively in independent color channels.

A plane formed by the first axis Ax and the optical axis C is represented as a first plane (virtual plane) and a plane formed by the second axis Ay and the optical axis C is represented as a second plane (virtual plane). FIG. 13 is a sectional view of the optical inspection apparatus 4 taken along the first plane. FIG. 14 is a sectional view of the optical inspection apparatus 4 taken along the second plane.

As illustrated in FIGS. 12 and 13, among rays from the subject S, rays parallel to the optical axis C and present in the first plane are represented as a first ray group L1. Two rays of a first ray L1a and a first ray L1b are considered as rays representing the first ray group L1. Among rays from the object side, rays in a direction inclined with respect to the optical axis C and present in the first plane is represented as a second ray group L2. Two rays of a second ray L2a and a second ray L2b are considered as rays representing the second ray group L2.

Figure 14:
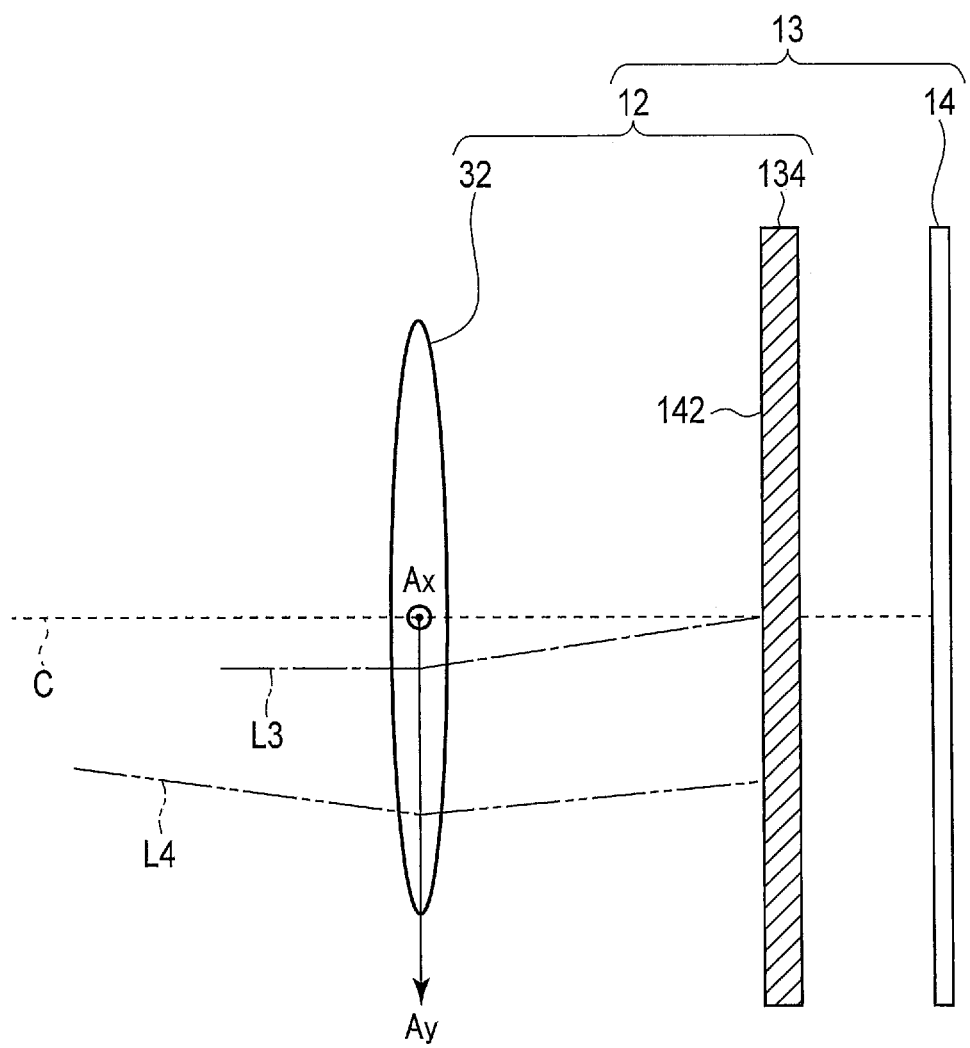
FIG. 14 is a schematic sectional view of the camera of the optical inspection apparatus of the optical inspection system illustrated in FIG. 12 when viewed from a second plane including an optical axis.

As illustrated in FIGS. 12 and 14, among the rays from the object side, rays parallel to the optical axis C and present in the second plane are represented as a third ray group. A third ray L3 is considered as a ray representing the third ray group. Among the rays from the object side, rays in a direction inclined with respect to the optical axis C and present in the second plane are represented as a fourth ray group. A fourth ray L4 is considered as a ray representing the fourth ray group.

As illustrated in FIGS. 12 and 13, a plane parallel to the first plane simultaneously crosses the first wavelength spectrum selection filter 142 and the second wavelength spectrum selection filter 144 of the color filter 134. That is, the plane parallel to the first plane crosses at least two different wavelength spectrum selection filters 142 and 144 of the color filter 134. As illustrated in FIGS. 12 and 14, a plane parallel to the second plane crosses one wavelength spectrum selection filter 142 of the color filter 134. That is, since the number of color filters 134 crossing the wavelength spectrum selection filters 142 and 144 of the color filter 134 is different between the first plane and the second plane, the color filter 134 is anisotropic and has anisotropy. In other words, since a distribution of the wavelength spectrum selection filters 142 and 144 is different depending on the directions of the first axis Ax and the second axis Ay, the color filter 134 is anisotropic.

In an optical system in which a ray from the object point O of the subject S is focused at an image point by the imaging optical system 32, in general, an optical system in which a principal ray is parallel to the optical axis C on the object side is referred to as an object-side telecentric optical system. In the present embodiment, when a ray substantially parallel to the optical axis C on the object side is focused by the imaging optical system 32, the ray has object-side telecentricity. On the other hand, when a ray not substantially parallel to the optical axis C on the object side and inclined is focused by the imaging optical system 32, the ray has object-side non-telecentricity.

Rays L1a and Lib of the first ray group from the object side are parallel to the optical axis C. The rays L1a and Lib reach a focal point of a focal plane of the imaging optical system 32. Therefore, the first rays L1a and L1b reach the first wavelength spectrum selection filter 142 of the color filter 134 placed on the focal plane. That is, the first rays L1a and Lib having telecentricity in the first plane reach the first wavelength spectrum selection filter 142.

The rays L2a and L2b of the second ray group from the object side are inclined with respect to the optical axis C in the first plane. The rays L2a and L2b of the second ray group deviate from the focal point on the focal plane of the imaging optical system 32 and reach, for example, the second wavelength spectrum selection filter 144. That is, the second rays L2a and L2b reach the second wavelength spectrum selection filter 144. That is, the rays L2a and L2b having non-telecentricity in the first plane reach the second wavelength spectrum selection filter 144.

Note that a part of the rays on the object side inclined with respect to the optical axis C in the first plane reach the second wavelength spectrum selection filter 144 and also reach the ray blocking section 146.

The ray L3 of the third ray group from the object side is parallel to optical axis C in the second plane. The ray L3 of the third ray group reaches the focal point of the focal plane of the imaging optical system 32. Accordingly, the third ray L3 reaches the first wavelength spectrum selection filter 142 of the color filter 134 placed on the focal plane. That is, the ray L3 having telecentricity in the second plane reaches the first wavelength spectrum selection filter 142.

The ray L4 of the fourth ray group from the object side is inclined with respect to optical axis C in the second plane. The ray L4 of the fourth ray group reaches the first wavelength spectrum selection filter 142 deviating from the focal point on the focal plane of the imaging optical system 32. That is, the fourth ray L4 reaches the first wavelength spectrum selection filter 142. That is, the rat having non-telecentricity in the second plane reaches the first wavelength spectrum selection filter 142.

Note that the ray on the object side inclined with respect to the optical axis C in the second plane does not reach the ray blocking section 146.

As explained above, in the first plane, the rays L1a and L1b having telecentricity and the rays L2a and L2b having non-telecentricity respectively reach different wavelength spectrum selection regions. On the other hand, in the second plane, both of the ray L3 having telecentricity and the ray L4 having non-telecentricity reach the same wavelength spectrum selection filter 142.

For any ray reaching the imaging optical system 32 from the object side in any direction, a path of the ray projected onto a first plane (see FIGS. 12 and 13) and a path of the ray projected onto a second plane (see FIGS. 12 and 14) are considered. The characteristics explained above respectively hold for the projected rays. That is, both the rays projected on the first plane, that is, the ray having telecentricity and the ray having non-telecentricity reach different wavelength spectrum selection regions of the color filter 134. On the other hand, both the rays projected onto the second plane, that is, the ray having telecentricity and the ray having non-telecentricity reach the same wavelength spectrum selection filter 142.

When the image sensor 14 of the optical inspection apparatus 4 of the present embodiment images the B light (the ray having the first wavelength spectrum) of an object, that is, obtains the B image data Ib, the first wavelength spectrum selection filter 142 of the color filter 134 emits the B light toward the image sensor 14. At this time, the first wavelength spectrum selection filter 142 of the color filter 134 blocks the R light (the ray having the second wavelength spectrum). The B light has telecentricity in the axial direction of the first axis Ax. Therefore, the optical inspection apparatus 4 can acquire the B image data Ib having telecentricity with the image sensor 14.

When the image sensor 14 of the optical inspection apparatus 4 images the R light (the ray having the second wavelength spectrum) of an object, that is, obtains the R image data Ir, the second wavelength spectrum selection filter 144 of the color filter 134 emits the R light toward the image sensor 14. At this time, the second wavelength spectrum selection filter 144 of the color filter 134 blocks the B light (the ray having the first wavelength spectrum). The R light has non-telecentricity in both the axial direction of the first axis Ax and the axial direction of the second axis Ay. This can also be rephrased as having entocentricity. That is, the optical inspection apparatus 4 can acquire an entocentric image of the R light with the image sensor 14. Accordingly, the optical inspection apparatus 4 can acquire an image having a large angle of view.

As explained above, the image sensor 14 of the optical inspection apparatus 4 according to the present embodiment simultaneously acquires images of the B light (for example, equivalent to specular reflection light) and the R light (for example, equivalent to scattered light) along the direction of the first axis Ax.

As explained above, the color filter 134 provided on the focal plane of the imaging optical system 32 between the imaging optical system 32 and the image sensor 14 emits the ray (for example, the B light) having the first wavelength and the ray (for example, the R light) having the second wavelength spectrum different from the first wavelength spectrum toward the image sensor 14 according to a ray direction from the subject S. The color filter 134 causes the image sensor 14 to acquire information of the first image concerning the first wavelength spectrum and information of the second image concerning the ray having the second wavelength spectrum. At this time, the image sensor 14 simultaneously acquires images of the rays having the first wavelength spectrum and the second wavelength spectrum that have passed through the color filter 134.

Note that the ray intensities of the R image data Ir and the B image data Ib acquired by the pixels of the image sensor 14 of the optical inspection apparatus 4 according to the present embodiment complementarily change when it is considered that a light amount of reflected light from the object point on the subject S is constant. That is, in a certain pixel, when the ray intensity of the R light in the certain pixel in a reflected ray from the subject S passing through the color filter 134 increases, the ray intensity of the B light decreases in the pixel. Furthermore, when the ray intensity of the B light increases in another pixel, the ray intensity of the R light decreases in the pixel. This is because a color and the direction of a ray are associated. That is, assuming that the intensity of the reflected light (for example, the R light) is constant, when reflected light components are concentrated in a certain direction, the remaining direction components equivalent to the B light and the G light decrease.

For example, it is assumed that the surface of the subject S is the standard surface S1 illustrated in FIG. 4. At this time, in light made incident on the image sensor 14 through the color filter 134 of the camera 13, a ray from the standard surface S1 is generated by the B light passing on the optical axis C (on the region A1) of the color filter 134. Accordingly, the image sensor 14 obtains specular reflection light reflected from the standard surface S1 as a blue image in the B image data Ib. All of the B image data Ib of the standard surface S1 of the subject S illustrated in FIG. 4 are obtained as blue images.

In light from a position equivalent to the standard surface S1, the R light is not made incident on the image sensor 14 or, even if the R light is made incident, a pixel value is negligibly small. Therefore, in the R image data Ir, an image of the standard surface S1 is black.

In the present embodiment, in the light made incident on the image sensor 14 through the color filter 134, the G light from the surface of the subject S is not made incident or, even if the G light is made incident, a pixel value is negligibly small. Therefore, the entire G image data Ig is black.

Therefore, the RGB image data Irgb obtained by the optical inspection apparatus 4 according to the present embodiment is colored according to direction information of a ray based on the color filter 34. The R image data Ir, the G image data Ig, and the B image data Ib obtained by separating the RGB image data Irgb into the color channels are respectively images based on surface information (unevenness information) of the subject S. As explained above, the optical inspection apparatus 4 according to the present embodiment acquires structure (unevenness) information of the subject S with an image captured by the image sensor 14.

When the surface of the subject S is the standard surface S1 illustrated in FIG. 4, a graph of the color coordinate system illustrated in FIG. 5 is obtained.

For example, it is assumed that the surface of the subject S includes the portion to be detected S2 on the standard surface S1 illustrated in FIG. 6.

In light made incident on the image sensor 14 through the color filter 134 of the camera 13, a ray from the standard surface S1 is generated by the B light passing on the optical axis C (on the region A1) of the color filter 34. Accordingly, the image sensor 14 obtains specular reflection light reflected from the standard surface S1 as a blue image in the B image data Ib.

In the present embodiment, light from a position equivalent to the portion to be detected S2 is not made incident on the image sensor 14 as the B light on the first plane (see FIG. 13). On the other hand, the light from the position equivalent to the portion to be detected S2 is made incident on the image sensor 14 as the B light on the second plane (see FIG. 14).

The light from the position equivalent to the portion to be detected S2 is made incident on the image sensor 14 as the R light on the first plane (see FIG. 13). Although not illustrated, in the light from the position equivalent to the portion to be detected S2, the R light is transmitted in the second wavelength spectrum selection filter 144 parallel to the second plane (see FIG. 14) and the light is made incident on the image sensor 14 as the R light.

Accordingly, when the surface of the subject S includes the portion to be detected S2 on the standard surface S1 illustrated in FIG. 6, a graph of a color coordinate system as illustrated in FIG. 7 is obtained.

Accordingly, the direction of the color vector illustrated in FIG. 5 and the direction of the color vector illustrated in FIG. 7 change according to a surface state of the subject S. Therefore, by performing the processing explained in the first embodiment with the processing device 20 illustrated in FIG. 1 using the camera 13 (see FIGS. 12 to 14) of the optical inspection apparatus 4 according to the present embodiment, it is possible to inspect a surface state of the surface of the subject S.

It is assumed that the surface of the subject S is in the state illustrated in FIGS. 9 and 10 in the second embodiment. In this case as well, by setting the reference vector data 24b as explained in the second embodiment using the camera 13 (see FIGS. 12 to 14) of the optical inspection apparatus 4 according to the present embodiment, it is possible to discriminate the surface state of the surface of the subject S.

According to the present embodiment, it is possible to provide the optical inspection method, the optical inspection program 24a, the processing device 20, and the optical inspection apparatus 4 capable of satisfactorily inspecting the surface state of the subject S.

Fourth Embodiment

A fourth embodiment is explained with reference to FIGS. 15 and 16. The present embodiment is a modification of the first to third embodiments. The same members or members having the same functions as the members explained in the first to third embodiments are denoted by the same reference numerals and signs as much as possible and detailed explanation of the members is omitted.

Figure 15:
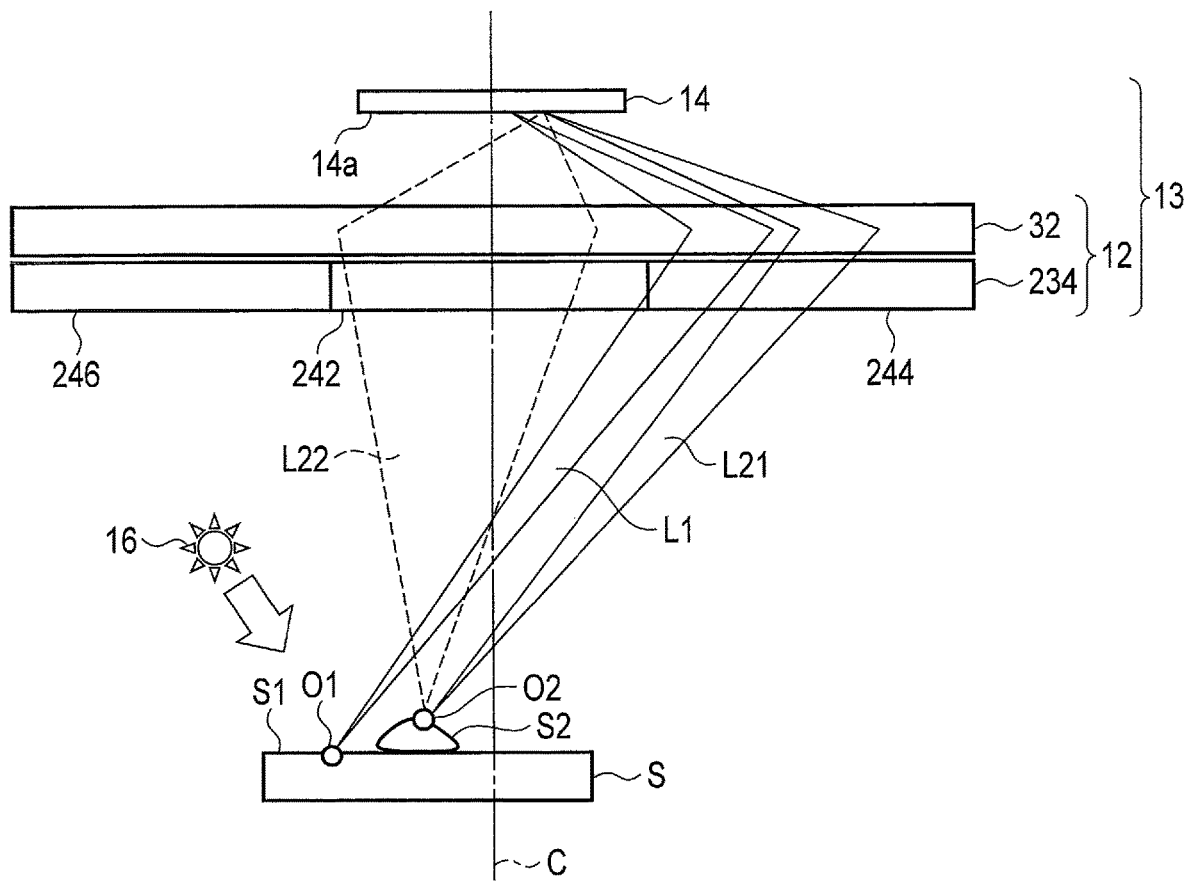
FIG. 15 is a schematic diagram illustrating a camera of an optical inspection apparatus of an optical inspection system according to a fourth embodiment.
Figure 16:
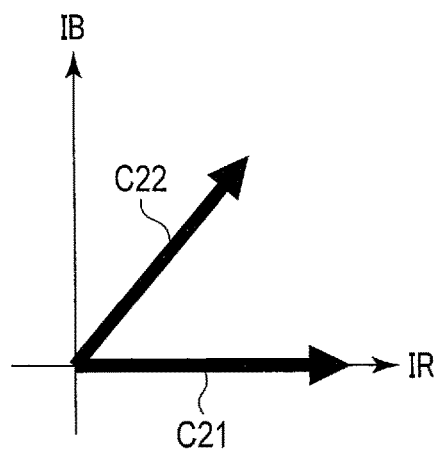
FIG. 16 is a schematic graph illustrating a color vector in which a surface state of a subject is calculated from an image of a standard surface illustrated in FIG. 15 and a color vector in which the surface state of the subject is calculated from an image of the portion to be detected at the time, in the case that the pixel value IR of the R light is plotted on a horizontal axis and the pixel value IB of the B light is plotted on a vertical axis.

As illustrated in FIG. 15, the optical device 12 includes a color filter (a wavelength spectrum selection portion) 234 and the imaging optical system (the imaging lens) 32. In the present embodiment, the imaging optical system 32 is disposed between the color filter 234 and the image sensor 14. The image sensor 14 includes the light receiving unit (the light receiving surface) 14a functioning as an image forming surface at a distance L with respect to the imaging optical system 32. The optical device 12 and the image sensor 14 configure a so-called camera (an imaging portion) 13.

The color filter 234 includes a first wavelength spectrum selection region 242, a second wavelength spectrum selection region 244, and a third wavelength spectrum selection region 246 in a certain cross section. The first wavelength spectrum selection region 242 and the second wavelength spectrum selection region 244 transmit lights in different wavelength spectrum ranges. The third wavelength spectrum selection region 246 is capable of transmitting, for example, light having the same wavelength spectrum as a wavelength spectrum in the second wavelength spectrum selection region 244.

Note that, instead of the color filter 234, the color filter 34 explained in the first embodiment may be used or the color filter 134 explained in the third embodiment may be used.

The light source 16 according to the present embodiment can irradiate the subject S with illumination light having directivity. Illumination light from the light source 16 is emitted in a state in which the illumination light is inclined with respect to the surface of the subject S.

The operation of the optical inspection system 2 according to the present embodiment is explained.

In FIG. 15, it is assumed that the surface of the subject S is basically the mirror surface (the standard surface) S1. It is assumed that the portion to be detected S2, which is a fine defect having a diffusion surface, is present on the surface. At this time, the first object point O1 is set on the surface of the subject S having a mirror surface shape and the second object point O2 is set on the portion to be detected S2.

Illumination light made incident on the first object point O1 from the light source 16 is reflected as the first reflection light L1 at the first object point O1. An incident angle of the illumination light made incident on the first object point O1 and a reflection angle of the light reflected by the first object point O1 coincide with respect to the optical axis of the imaging optical system 32.

Since the first object point O1 is present on the mirror surface, the light has more specular components (specular reflection components). Here, since the illumination light from the light source 16 has directivity, a direction of the specular components is determined according to the direction. That is, a light distribution of the first reflected light tends to be a narrow angular distribution as indicated by reference sign L1 in FIG. 15.

The light made incident on the second object point O2 is reflected as second reflected lights L21 and L22. Since the second object point O2 is present, for example, on a rough surface, the second reflected light includes a diffusion component L22. However, the illumination light from the light source 16 has directivity. Accordingly, the second reflected light includes a specular component L21 as well. That is, a light distribution of light includes the diffusion component L22 together with the specular component L21 as indicated by reference signs L22 and L21 in FIG. 15. That is, a light distribution component of the second reflected light tends to be a wide angular distribution.

At the second object point O2 having a fine defect, the second reflected light has the diffusion component L22 and the specular component L21. The light passes through the color filter 234 and further passes through the imaging optical system 32. At this time, in the color filter 234, the light selectively passes through the first wavelength spectrum selection region 242 and the second wavelength spectrum selection region 244. The light passing through the first wavelength spectrum selection region 242 is, for example, blue (B) light in a wavelength spectrum range of 400 nm to 500 nm. The light passing through the second wavelength spectrum selection region 244 is, for example, red (R) light in a wavelength spectrum range of 600 nm to 700 nm. That is, the second reflected light passes through at least two or more different wavelength spectrum selection regions 242 and 244. The second reflected light is focused on the image sensor 14 by the imaging optical system 32. The second reflected light from the second object point O2 is focused on the image sensor 14 through the third wavelength spectrum selection region 246 depending on a reflecting direction.

At the first object point O1 having no fine defect, the first reflected light is the substantially specular component L1. Accordingly, the first reflected light passes through the second wavelength spectrum selection region 244 of the color filter 234. The light of the spectral component L1 passing through the second wavelength spectrum selection region 244 is, for example, red (R) light in a wavelength spectrum range of 600 nm to 700 nm.

Color vectors C2=(IR, IB) corresponding to the object points O1 and O2 are calculated by the processing device 20. A color vector C21 corresponding to the first object point O1 has a red intensity component (IR). A color vector C22 corresponding to the second object point O2 has a blue intensity component (IB) and a red intensity component (IR).

Accordingly, the direction of the color vector C21 at the first object point O1 without a fine defect and the direction of the color vector C22 at the second object point O2, which is the fine detect, are different. That is, presence or absence of a fine defect can be identified by the directions of the color vectors C21 and C22.

As explained above, the surface state of the subject S can be discriminated by setting the color vector C21 based on the first reflected light from the first object point O1 as a reference vector and comparing the color vectors C2 in the pixels based on the second reflected light from the second object point O2 with the reference vector. The identification of presence or absence of a fine defect is output according to the flowchart illustrated in FIG. 8 based on the optical inspection program 24a and the reference vector data 24b explained in the first embodiment.

In the present embodiment, an example is explained above in which the illumination light from the light source 16 is obliquely made incident on the subject S. As explained above, the illumination light from the light source 16 is not limited to coaxial epi-illumination. Illumination lights from various directions can be used. With such illumination light, the surface state of the subject S can be discriminated by comparing the calculation result obtained by calculating the color vector Cn and the reference vector by the processing device 20.

Therefore, according to the present embodiment, it is possible to provide the optical inspection method, the optical inspection program 24a, the processing device 20, and the optical inspection apparatus 4 capable of satisfactorily inspecting the surface state of the subject S.

Note that the position of the color filter 234 may be a position between the subject S and the imaging optical system 32 or may be a position between the imaging optical system 32 and the image sensor 14. When the imaging optical system 32 is configured by, for example, a plurality of lenses, the color filters 234 may be disposed among the plurality of lenses.

According to at least one embodiment explained above, it is possible to provide the optical inspection method, the optical inspection program 24a, the processing device 20, and the optical inspection apparatus 4 capable of satisfactorily inspecting the surface state of the subject S.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical inspection method for a surface state of a subject comprising:
    acquiring a color vector with a pixel value of each color for each pixel corresponding to a wavelength spectrum in a color coordinate system of n dimensions (n is a natural number equal to or larger than 1), which is equal to or smaller than a number of a plurality of color channels of pixels of an image sensor, with optical imaging using a wavelength spectrum selection portion that selectively allows a plurality of wavelength spectra different from one another from a surface of the subject to pass; and
    discriminating the surface state of the subject corresponding to said each pixel based on a direction of the color vector in the color coordinate system,
    wherein
        when a color vector corresponding to a specular reflection direction or a first scattering direction from the surface of the subject is represented as a first reference vector and a color vector corresponding to the specular reflection direction or a second scattering direction different from the first scattering direction is represented as a second reference vector,
        the discriminating the surface state of the subject includes discriminating a type of the surface according to whether the direction of the color vector is close to the first reference vector or close to the second reference vector.

2. The optical inspection method according to claim 1, further comprising:
    associating the direction of the color vector in the color coordinate system and the wavelength spectra.

3. The optical inspection method according to claim 1, wherein
the wavelength spectra different from one another respectively have different directions of light from the subject.

4. A non-transitory storage medium storing an optical inspection program for a surface state of a subject, the optical inspection program causing a computer to implement:
    acquiring a color vector with a pixel value of each color for each pixel corresponding to a wavelength spectrum in a color coordinate system of n dimensions (n is a natural number equal to or larger than 1), which is equal to or smaller than a number of a plurality of color channels of pixels of an image sensor, with optical imaging using a wavelength spectrum selection portion that selectively allows a plurality of wavelength spectra different from one another from a surface of the subject to pass; and
    discriminating the surface state of the subject corresponding to said each pixel based on a direction of the color vector in the color coordinate system,
    wherein
        when a color vector corresponding to a specular reflection direction or a first scattering direction from the surface of the subject is represented as a first reference vector and a color vector corresponding to the specular reflection direction or a second scattering direction different from the first scattering direction is represented as a second reference vector,
        in the processor configured to discriminate the surface state of the subject, the processor is configured to discriminate a type of the surface according to whether the direction of the color vector is close to the first reference vector or close to the second reference vector.

5. A processing device used for an optical inspection of a surface state of a subject, the processing device including a processor being configured to:
    acquire a color vector with a pixel value of each color for each pixel corresponding to a wavelength spectrum in a color coordinate system of n dimensions (n is a natural number equal to or larger than 1), which is equal to or smaller than a number of a plurality of color channels of pixels of an image sensor, with optical imaging that selectively allows a plurality of wavelength spectra different from one another from a surface of the subject to pass; and
    discriminate the surface state of the subject corresponding to said each pixel based on a direction of the color vector in the color coordinate system,
    wherein
        when a color vector corresponding to a specular reflection direction or a first scattering direction from the surface of the subject is represented as a first reference vector and a color vector corresponding to the specular reflection direction or a second scattering direction different from the first scattering direction is represented as a second reference vector,
        in the processor configured to discriminate the surface state of the subject, the processor is configured to discriminate a type of the surface according to whether the direction of the color vector is close to the first reference vector or close to the second reference vector.

6. An optical inspection apparatus comprising:
an imaging portion including:
    a wavelength spectrum selection portion provided in a position of a focus of an imaging optical system, the wavelength spectrum selection portion being an optical film that has at least two different transmission wavelength spectral regions and being configured to selectively allow a plurality of wavelength spectra different from one another from a surface of a subject to pass; and an image sensor configured to image light passing through the wavelength spectrum selection portion; and the processing device according to claim 5 configured to acquire the color vector based on an image acquired by the image sensor and discriminate a surface state of the subject based on a direction of the color vector.

7. The optical inspection apparatus according to claim 6, wherein the wavelength spectrum selection portion is rotationally symmetrical with respect to an optical axis of the imaging optical system.

8. The processing device according to claim 5, wherein the processor is configured to:

associate the direction of the color vector in the color coordinate system and the wavelength spectra.

9. The processing device according to claim 5, wherein the wavelength spectra different from one another respectively have different directions of light from the subject.

* * * * *